United States Patent [19]

Burkenpas

[11] Patent Number: 4,739,236
[45] Date of Patent: Apr. 19, 1988

[54] PORTABLE HELM

[75] Inventor: Richard W. Burkenpas, Lynnwood, Wash.

[73] Assignee: Russel H. Keyes, Seattle, Wash.

[21] Appl. No.: 65,078

[22] Filed: Jun. 22, 1987

Related U.S. Application Data

[63] Continuation of Ser. No. 805,988, Dec. 5, 1985, which is a continuation-in-part of Ser. No. 652,860, Sep. 21, 1984, abandoned.

[51] Int. Cl.$^4$ .................. B63H 25/02; G05D 1/00
[52] U.S. Cl. .................... 318/588; 318/85; 114/144 A; 114/144 RE; 74/480 B; 340/987; 440/1; 440/2; 440/3; 440/87
[58] Field of Search .................. 318/588, 85, 310; 440/1, 2, 3, 87; 340/984, 985, 987; 114/144 A, 144 RE, 157; 364/424, 443, 434; 74/480 B

[56] References Cited

U.S. PATENT DOCUMENTS

| | | | |
|---|---|---|---|
| 2,891,205 | 6/1959 | Freeman | 318/588 |
| 3,018,750 | 1/1962 | Hill | 114/144 R |
| 3,079,531 | 2/1963 | Tugwood | 318/85 |
| 3,133,520 | 5/1964 | Bentkowsky | 318/588 |
| 3,140,689 | 7/1964 | Miner | 440/1 |
| 3,865,063 | 2/1975 | Norton | 318/588 |
| 3,881,443 | 5/1975 | Hamp | 440/1 |
| 3,952,681 | 4/1976 | Tucker | 318/588 |
| 3,976,023 | 8/1976 | Noguchi | 114/144 E |
| 4,223,624 | 9/1980 | Iyeta | 114/144 E |
| 4,253,149 | 2/1981 | Cunningham | 318/588 |
| 4,405,884 | 9/1983 | Weber | 318/85 |
| 4,420,741 | 12/1983 | West | 440/2 |
| 4,595,867 | 6/1986 | Cognevich | 114/144 RE |

FOREIGN PATENT DOCUMENTS

| | | | |
|---|---|---|---|
| 0007793 | 1/1982 | Japan | 440/2 |
| 0094898 | 5/1985 | Japan | 114/144 E |
| 2030726 | 4/1980 | United Kingdom | 318/588 |
| 381066 | 8/1973 | U.S.S.R. | 318/588 |
| 380532 | 8/1973 | U.S.S.R. | 318/588 |

Primary Examiner—William M. Shoop, Jr.
Assistant Examiner—Patrick C. Keane
Attorney, Agent, or Firm—Harry M. Cross, Jr.

[57] ABSTRACT

There is disclosed a portable system to control and monitor the basic maneuvering functions of marine vessels: The control and monitoring functions are contained on a hand held, small and lightweight consul which can be plugged into multi-pin sockets which are wired from various remote places of the ship to a central electronics logic and control module matrix. Switches on the portable helm control the electronic module matrix which powers servo motors mechanically linked to: engines' throttle controls, shift forward-neutral-reverse controls, and steering apparatus. Feedback loops monitor the positions of these maneuvering functions. Monitored on the portable helm are: rudder angle, engines' idle status, forward, neutral and reverse status of each drive trian, power on, and engines' synchronization. A synchronization circuit is disclosed which provides automatic speed equalization of multi-engine marine vessels, and a shift inhibit circuit which prevents shifting the engines wherever the engine speeds are above idle. The system can operate alone or as an adjunct to existing helm systems.

12 Claims, 19 Drawing Sheets

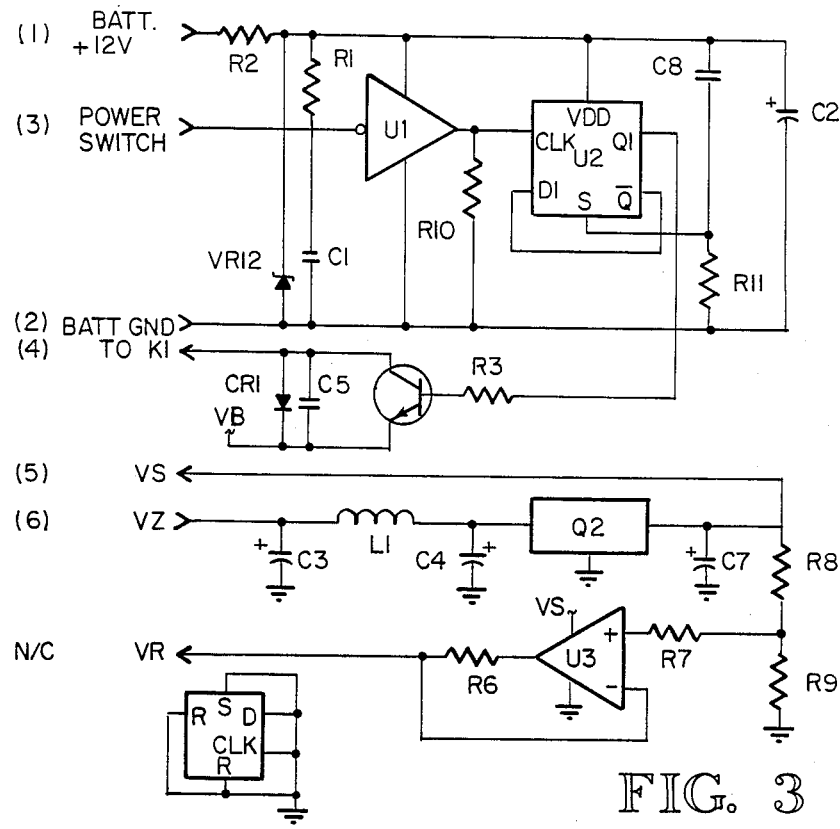
FIG. 3
FIG. 4
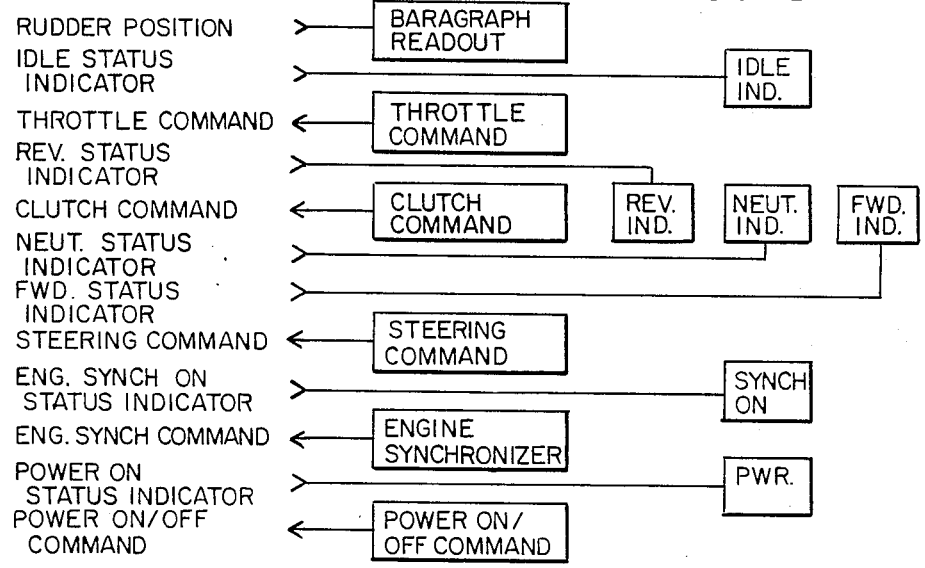

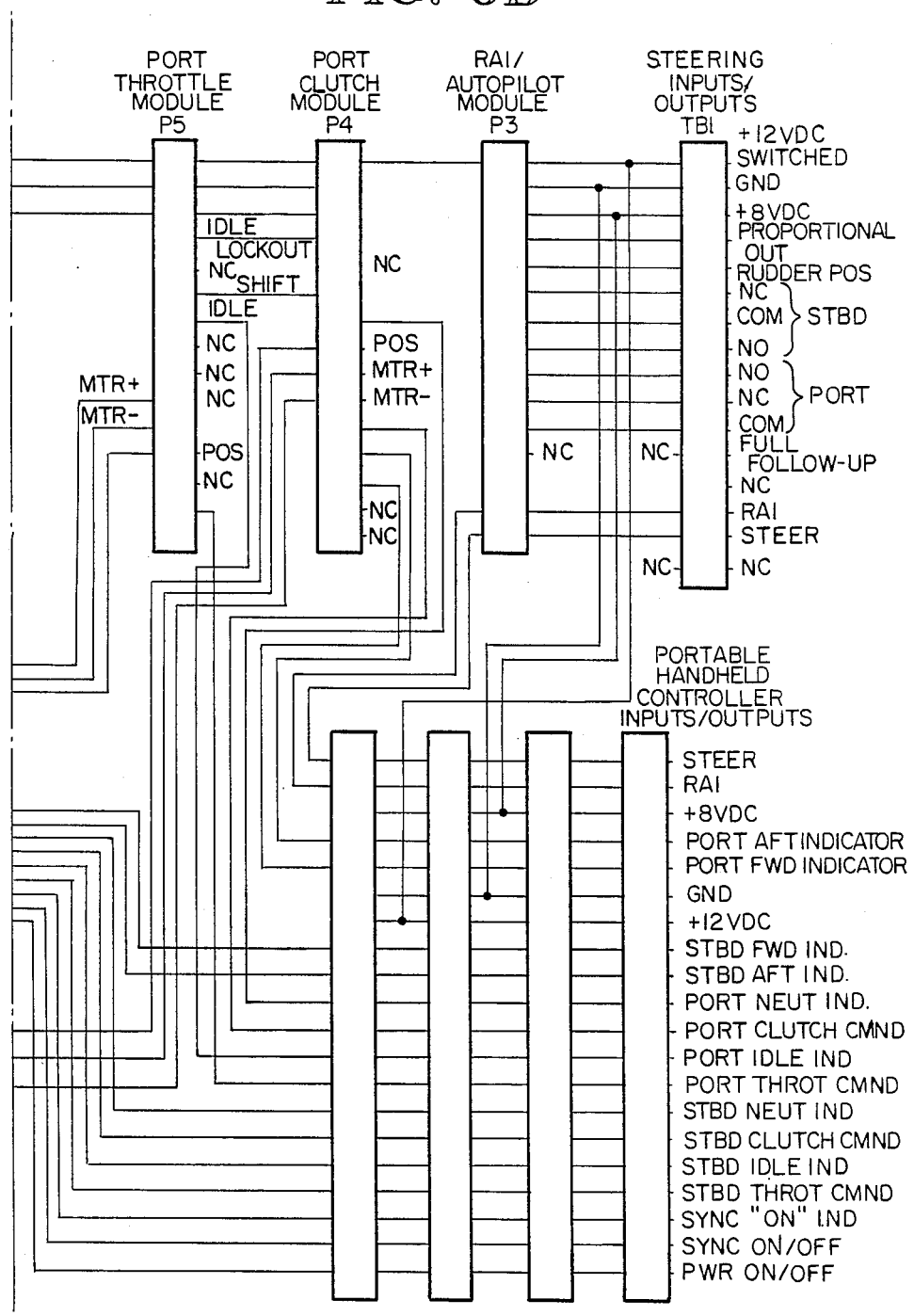

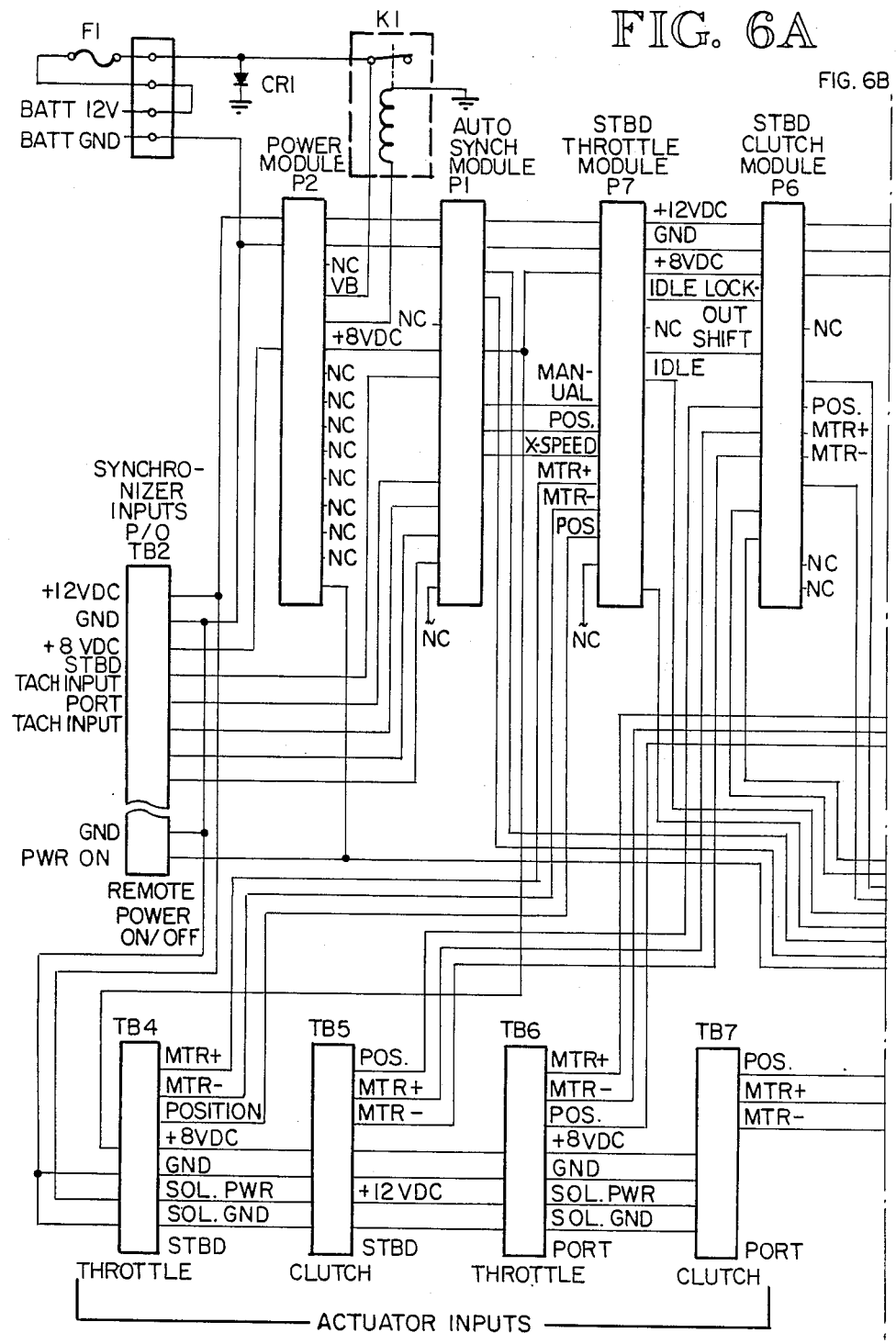

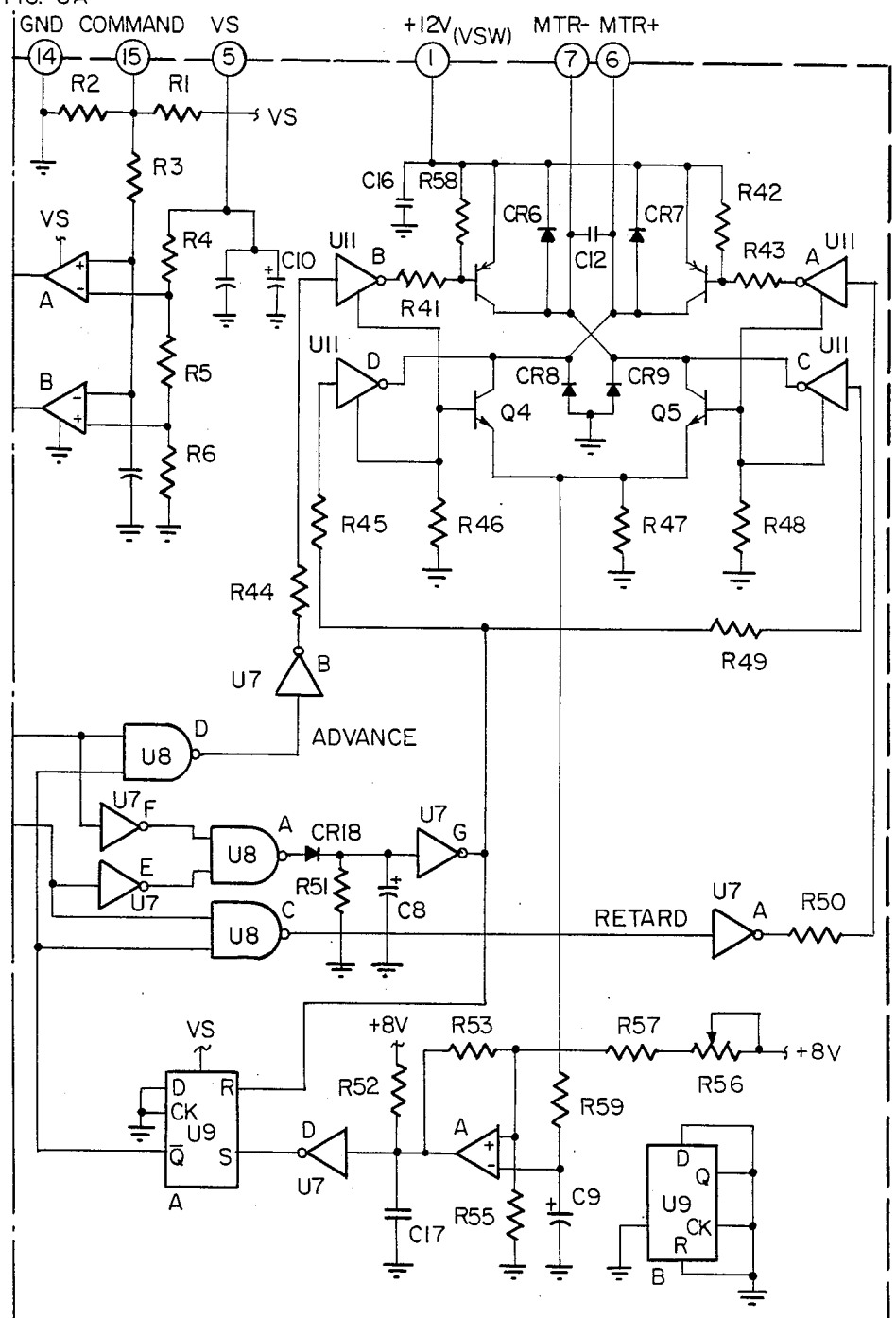

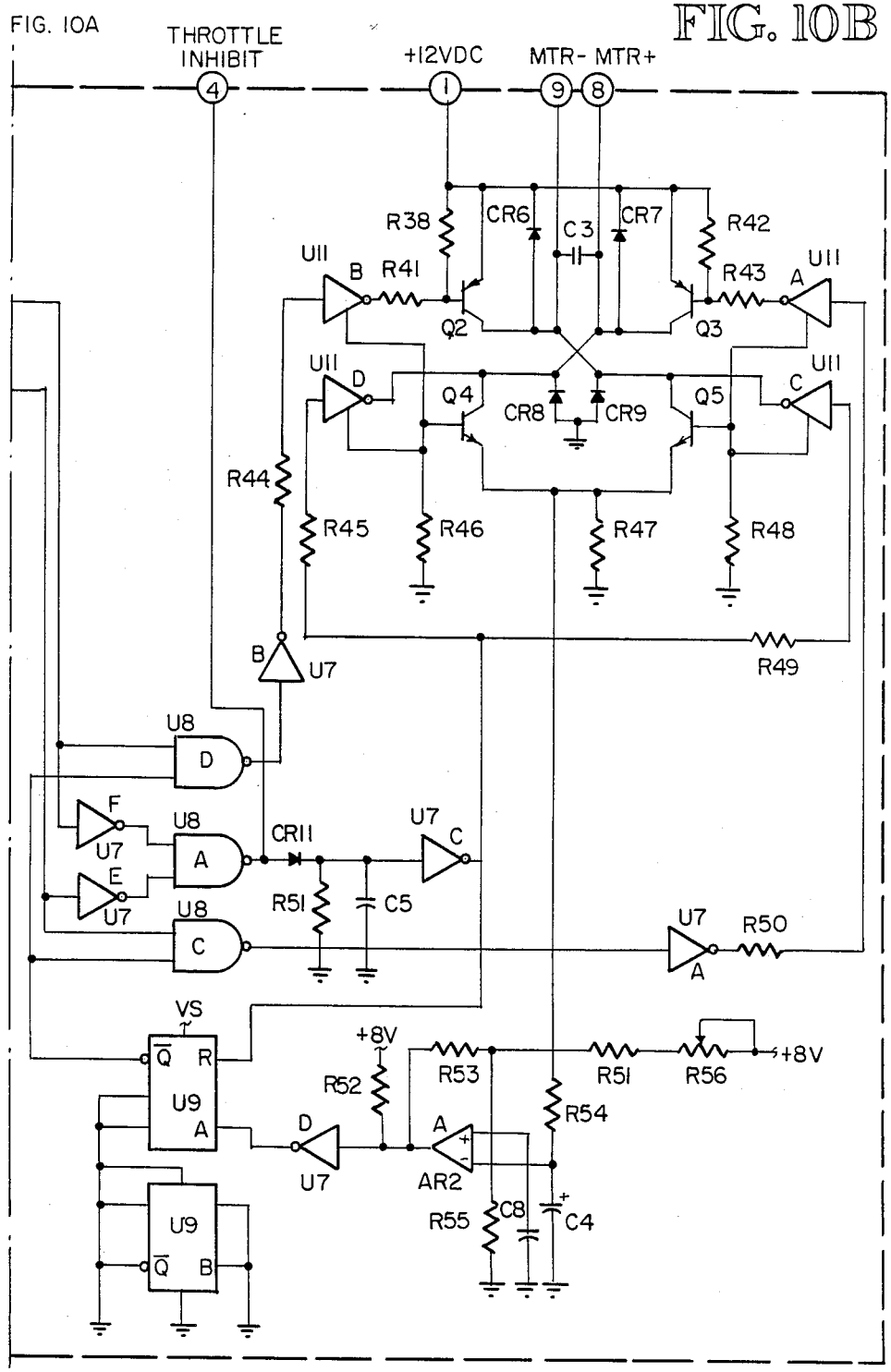

PORTABLE HELM

This application is a, continuation, of application Ser. No. 06/805,988 filed Dec. 5, 1985, which was a continuation-in-part of application Ser. No. 652,860 filed Sept. 21, 1984 now abandoned.

This invention relates generally to a portable system to control and monitor the maneuvering functions of marine vessels or ships. More particularly, this invention relates to an electronic system which can control ship's power train, the speed of the engines, assume engine synchronization control, steerage as well as indicate to the helmsman engine idle status, engine synchronization status, power on and rudder angle from any of many remote position on a ship.

Powered marine vessels with one or more engines are often constructed to include one or more stationary control stations or helms. A typical arrangement would include a master helm located on the main level of a vessel with perhaps a second helm at an elevated level such as a flying bridge where visibility is improved. Often situations arise where visibility from th main or secondary helm is limited requiring the stationing of crew to various portions of the ship to relay crucial manuevering information to the helmsman. In these situations, small misjudgments by inexperienced crew o confusion of information relayed to the helmsman can result in damage to the ship. A portable helm, that is a portable maneuvering control panel and indicating panel which can be easily moved throughout the ship would provide a helmsman with direct information and control of the maneuvering vessel from crucial vantage points.

In the past, systems to control ships maneuverability from various locations on the ship have been limited to control systems only. They did not provide for indication of rudder angle, engine idle status, or shift status.

Accordingly, a general object of the present invention is to provide a portable electronic control system for maneuvering a boat which can also monitor the ship's maneuvering and power control system.

Another object of the present invention is to provide a portable control helm which is disengagably connected to the rest of the electronic control and monitoring system so that the system is small, lightweight and may be carried by one helmsmen.

A more specific object of the present invention is to provide a portable electronic control system for controlling the maneuverability of marine vessels wherein the drive system and steerage can be independently monitored and regulated from various remote positions on a ship.

A further object of the present invention is to provide a portable electronic control system for the control of multiple shifts, the throttles, multiple engine synchronization, and steering mechanisms of a ship.

A further object of the present invention is to provide for a portable helm system which can monitor and indicate ship's rudder angle, multiple engine synchronization, engine idle status, neutral, and reverse status.

Other objects and advantages of the present invention will become apparent from the following description taken in conjunction with the accompanying drawings.

DISCLOSURE OF INVENTION

The basic maneuvering functions of a boat include: Steering by controlling the rudder angle, controlling engine's speed (often referred to as "engine RPM" referring to the speed of the engine as revolutions per minute), and changing the power train's direction by engaging a shift mechanism into forward, neutral or reverse status. Ships with separate starboard-port engines, can also be maneuvered by asynchronous running of the engines.

The system has 4 basic elements:
(1) a hand-held controller which can be plugged into multipin connector sockets wired at various parts of the ship;
(2) a stationary electronics matrix, or base or module matrix where most of the power and logic circuitry for the system is located;
(3) logic circuitry and the system remote motors mechanically linked to the steering mechanism, the throttle mechanisms and the power train shift mechanisms of the vessel; and
(4) the responders which detect: steerage by measuring rudder angle, shift status by detecting forward-neutral and reverse status, engine speed by detecting engine RPM.

A hand held controller unit is disengageably connected to an electronic matrix system from various locations of the ship by means of multi-pin male-female connectors and sockets; the sockets are wired from the electronic's matrix to various locations of the ship using multi-element cables.

The controller unit has a rudder position indicating system of 13 light emitting diodes—LED's arranged horizontally with the center LED indicating 0 degrees. Six LED's on the right hand side of the center position indicate from left to right: 5 degrees, 10 degrees, 15 degrees, 20 degrees, 30 degrees, and 40 degrees starboard respectively. The remaining 6 LED's on the left hand side of the center LED indicate from right to left, 5 degrees, 10 degrees, 15 degrees, 20 degrees, 30 degrees and 40 degrees port respectively. These indicating lamps are controlled by a reostat voltage control, mechanically linked to the rudder movement. The resulted voltage from the reostat corresponds to a rudder angle, and is converted by logic circuits to power the LED's. In my preferred embodiment, I also use an amber color LED for center, red LED's for port and green LED's for starboard steerage. The controller unit also has an engine idle status lamp. This lamp is powered by a circuit which monitors the engine speed and compares it with a reference; whenever the engine speed is within a tolerance level of the reference, logic circuits enable the engine idle status lamp to light. The controller has LED's to indicate a forward, neutral and reverse status of the shift apparatus, these LED's are controlled by logic circuits enabled by a shift mechanism switch. The controller also indicates engine synchronization status controlled by an automatic circuit which monitors engines' speeds and adjusts the throttle on one of the engines until the engines' speeds are equal.

The user activates the electronic controller from the portable helm by switches on the face plate of the hand-held box-like enclosure.

The controller is turned on and off by a single pole, single throw momentary power switch which enables a power supply module in the remote interconnecting matrix to provide power to the system, including the controller.

The controller has two clutch or shift switches which are single pole, double throw, center off switches. Once placed in a given position, each switch will remain in that position until it is deliberately moved to another position. Placing the shift switch into a forward (F) position connects the circuitry of a shift control module located in the remote interconnecting matrix to power a shift servo motor, mechanically linked to the shift mechanism to shift into a forward engagement position. By placing the shift switch into a reverse (R) position enables the circuitry of the shift control module to activate the shift servo motor to shift into a reverse engagement position. Placing the switch into a neutral (N) position enables the circuitry of the shift control module to power the shift servo motor to shift into a neutral engagement position.

Status indicator LED's grouped around each shift actuator switch and controlled by responding switches mechanically linked to the shift mechanism provide visual feedback information to verify to the helmsman that the ship commands were accomplished.

The controller has throttle commands, one for the port engine and another for the starboard engine which are controlled by single pole, double throw, center off momentary contact switches. Ships engine speeds are advanced by momentarily moving these switches in the advance position, and retarded by momentarily moving these switches in the opposite direction. The center position commands the engine to maintain the speed constant. Idle indicator lamps are provided on the controller to verify when the engines have reached an idle speed. Idle speed knowledge is important because the shift control module is configured such that it will not respond unless the engines ar at true idle speed.

The controller has a steering actuator control which is a single pole, double throw, center off switch. This switch controls a remote motor mechanically linked to the steering mechanism or rudder control. Pulling this switch to the left enables a remote interconnecting matrix to power this motor to turn the steering mechanism into a port direction. Pulling this switch to the right enables the remote interconnecting matrix to power this motor to turn the steering mechanism into a starboard direction. The center position commands the motor to keep the steering mechanism in a constant position.

The controller has an automatic dual engine synchronizer switch which is a single pole, single throw momentary switch which activates a remote automatic engine synchronizing module. This module compares the RPM's of the starboard and port engine, controls one of the throttles until both RPM's are synchronous. An indicator lamp indicates to the helmsman when both port and starboard engine's speeds are the same.

The control monitor is designed to be lightweight and compact has a convenient hook or hanger to facilitate stowing onto a bulkhead, and a hand grip to conveniently carry the monitor with one hand. The various control and monitoring circuits are run through a multi-element shielded cable from the base of the monitor's handle through a multi-pin connector plug means to any of many permanently wired matching socket means conveniently located around the boat. The sockets in turn are wired into an electronic base matrix which holds the various electronic control and logic systems. The system incorporates servo motors mechanically attached to: The throttles of eac engine, the steering mechanism, the shift control apparatuses of the ship. These servo motors are controlled and powered by the electronic base matrix, which is hard wired to the servo motors.

The stationary electronic interconnecting matrix and controls module base contains most of the electronics to power this system, to receive the various signals from the hand controller, to receive the various signals from the responders, and to generate controlling signals for the remote, servo motors, and status signals for the controller. In the preferred embodiment, various modules can be plugged into the matrix: a steering module, engine synchronization module, port clutch control module, port throttle control module, starboard clutch control module, and a starboard throttle control module. The matrix receives information from the port and starboard engine tachometers, and the rudder speed responder. Servo motor signals are sent to: the port throttle, the starboard throttle, the port clutch, the starboard clutch, and the steering servo motors. Each servo motor or remote transfer module is provided with an internal motor position responder which provides information to the corresponding control module as part of a position feedback loop. This feedback information controls the logic circuitry within the control module which determines the speed and direction of the motor as well as provide information for the indicating lamps. The remote transfer module are designed to mechanically link to ship's existing control functions and not to interfer with these control functions whenever the portable helm system is not in use.

Responders provide information to the logic circuits enabling the system to detect the status of the various systems: port RPM, port clutch position, starboard RMP, starboard clutch position, steering or rudder angle position. This information together with the responder feedbacks loops within the remote transfer modules provide the information required for the logic circuits to control the system and to provide indicator status information.

The invention contemplates an automatic engine synchronization circuitry and control. This is very useful for marine vessels having port and starboard engines. One of these engines is arbitrarily designated the master engine while the other is then designated the slave engine. The speeds of these engines are measured, a control circuitry generates a signal to control the throttle of the slave engine, the signal determined by the differences in speeds between both engines, and when applied to the throttle of the slave engine decreases the difference of speeds. When both engines are at the same speeds, the circuitry generates a synchronization signal which is indicated on the portable helm hand held controller.

BRIEF DESCRIPTION OF THE DRAWINGS

FIG. 3: is a schematic diagram of the power supply module.

FIG. 4: is a block diagram of the portable hand held controller.

FIGS. 6A,B: is a schematic diagram of the interconnecting / control matrix.

BEST MODE FOR CARRYING OUT THE INVENTION

Figure 1:
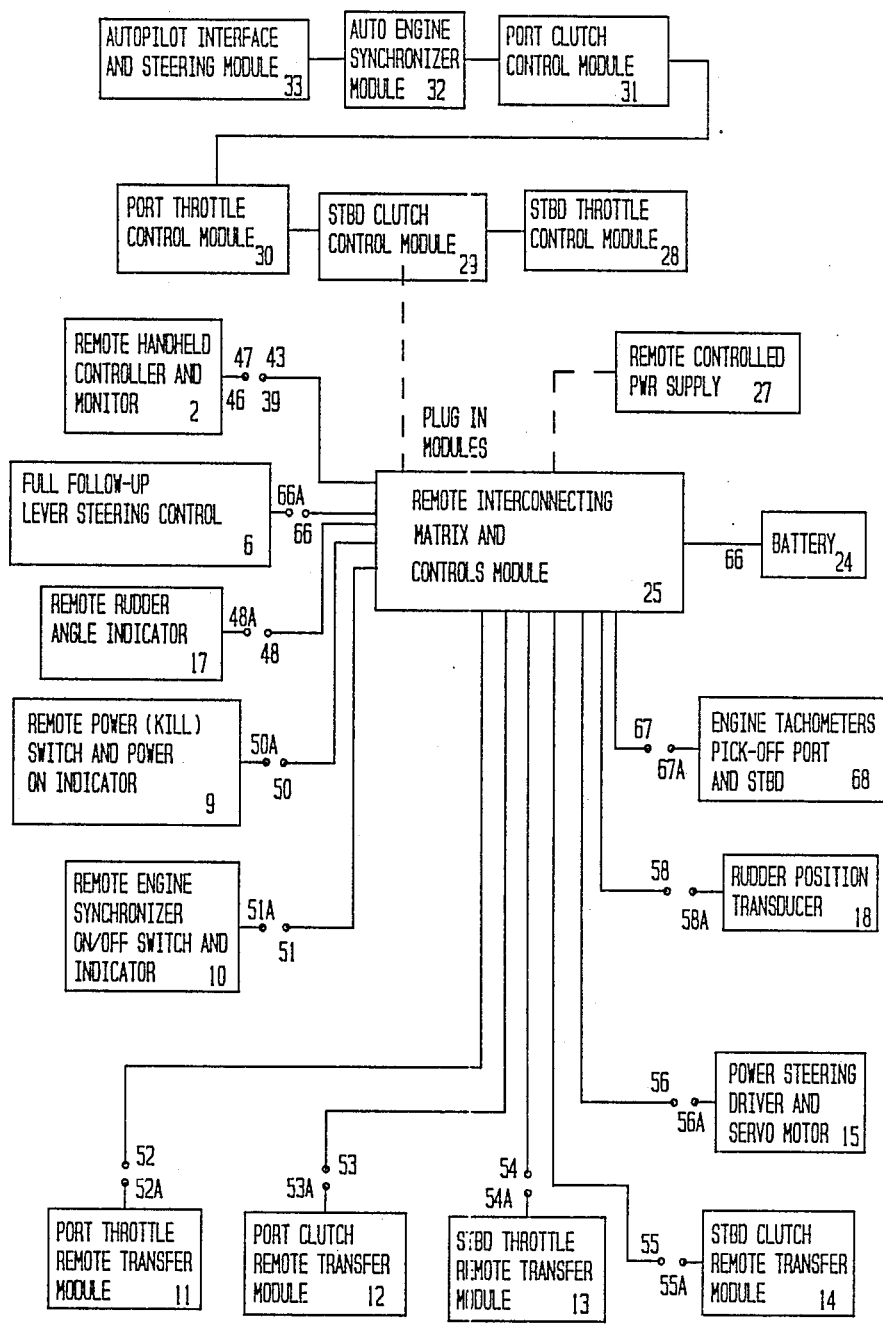
FIG. 1: is a block diagram of the basic control system of this invention.

Referring to the drawings, wherein like numerals refer to like parts, there is seen in FIG. 1 a block diagram of the invention's control system, configured to provide portable multihelm control and monitoring of a marine vessel powered by one or more engines. The portable hand held controller and monitor, generally designated by the number 2, is disengably connected to the control system by helm interconnecting cable 46 and helm cable plug 47. Helm cable plug 47 connects with remote socket 43 which is mounted on the vessel bulkhead. Socket 43 is connected by remote interconnecting cable 39 to the remote interconnecting matrix and control module 25. Interconnecting matrix and control module 25 is located in or near the engine room in an easily accessible area which will accomodate the routing of various cables which connect into it. Selection of a location for the interconnecting matrix and control module 25 is eased by the fact that all of the systems interconnecting cables may be routed in any manner, which is otherwise convenient, to avoid structural alterations to the vessel or interference with existing fixtures and appliances.

Though only one remote plug-in location 43 is shown, any number or parallel connections can be formed. It is not necessary to install all sockets 43 at the time of the original installation as system expansion is easily accomplished. Often user experience with the system has identified new locations which would be useful. Expansion is accomplished by the installation of a new socket and routing of its remote interconnect cable to an unused terminal port in the interconnecting matrix and control module 25, or by forming a parallel connection using a remote terminal strip. This same ease and flexability of installation also greatly simplifies the task of moving an existing installed socket 43 to a new location. Interconnecting matrix and control module 25 functions internally as a parallel buss connection for additional interconnect cables. The number of buss connections is equal to the total number of conductors within interconnect cable 39.

Figure 5:
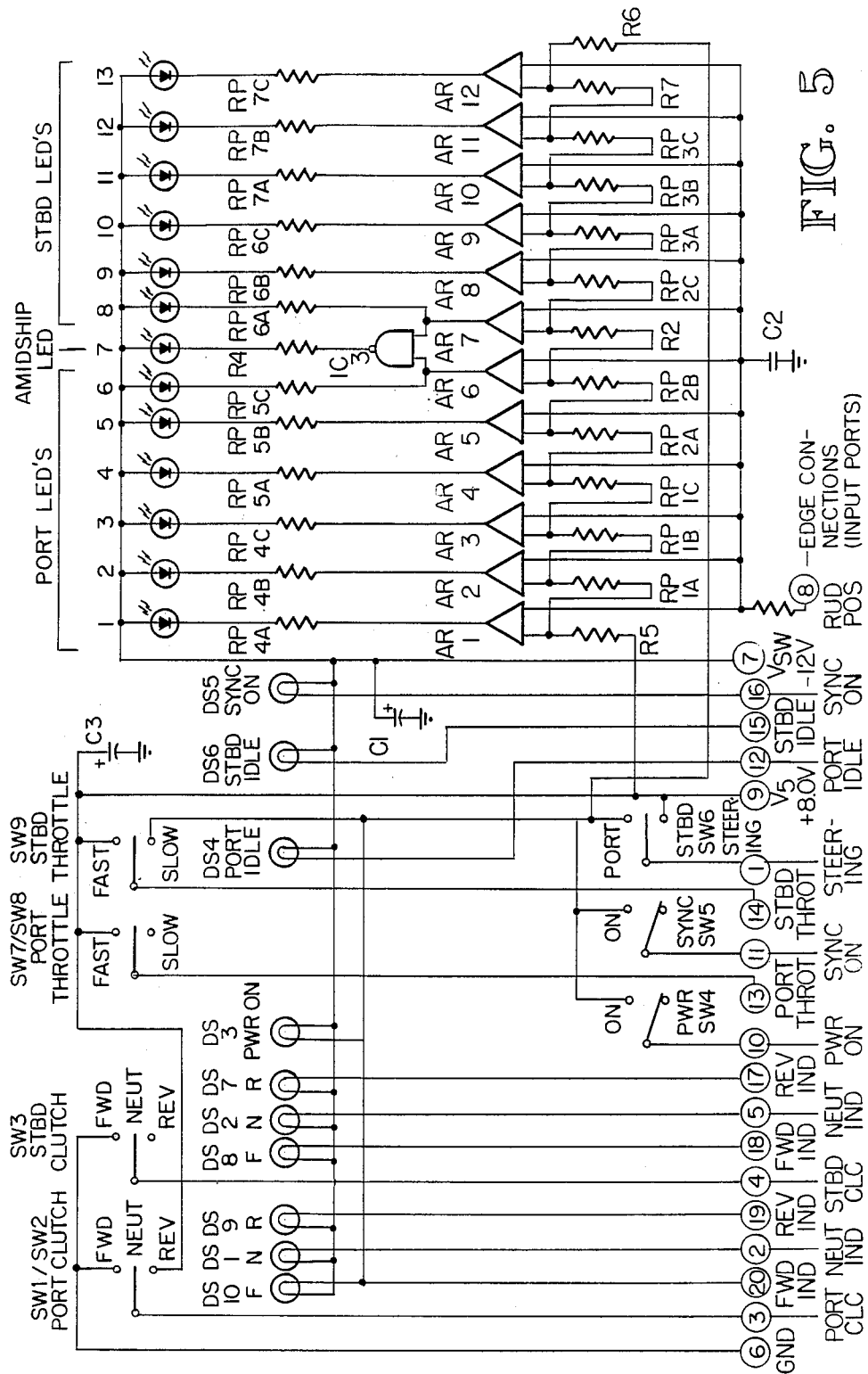
FIG. 5: is a schematic diagram of the portable hand held controller.
Figure 18A:
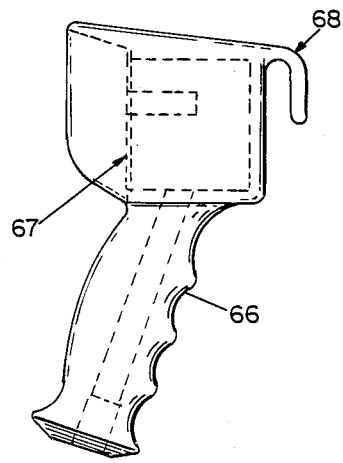
FIGS. 18A,B: is an illustrative view of portable hand held controller casting.
Figure 18B:
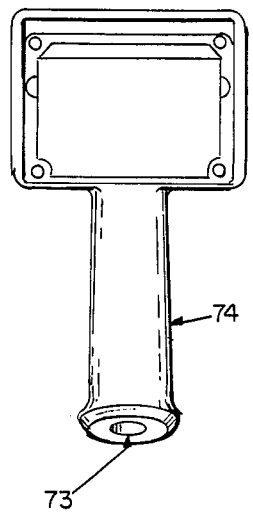
Figure 21:
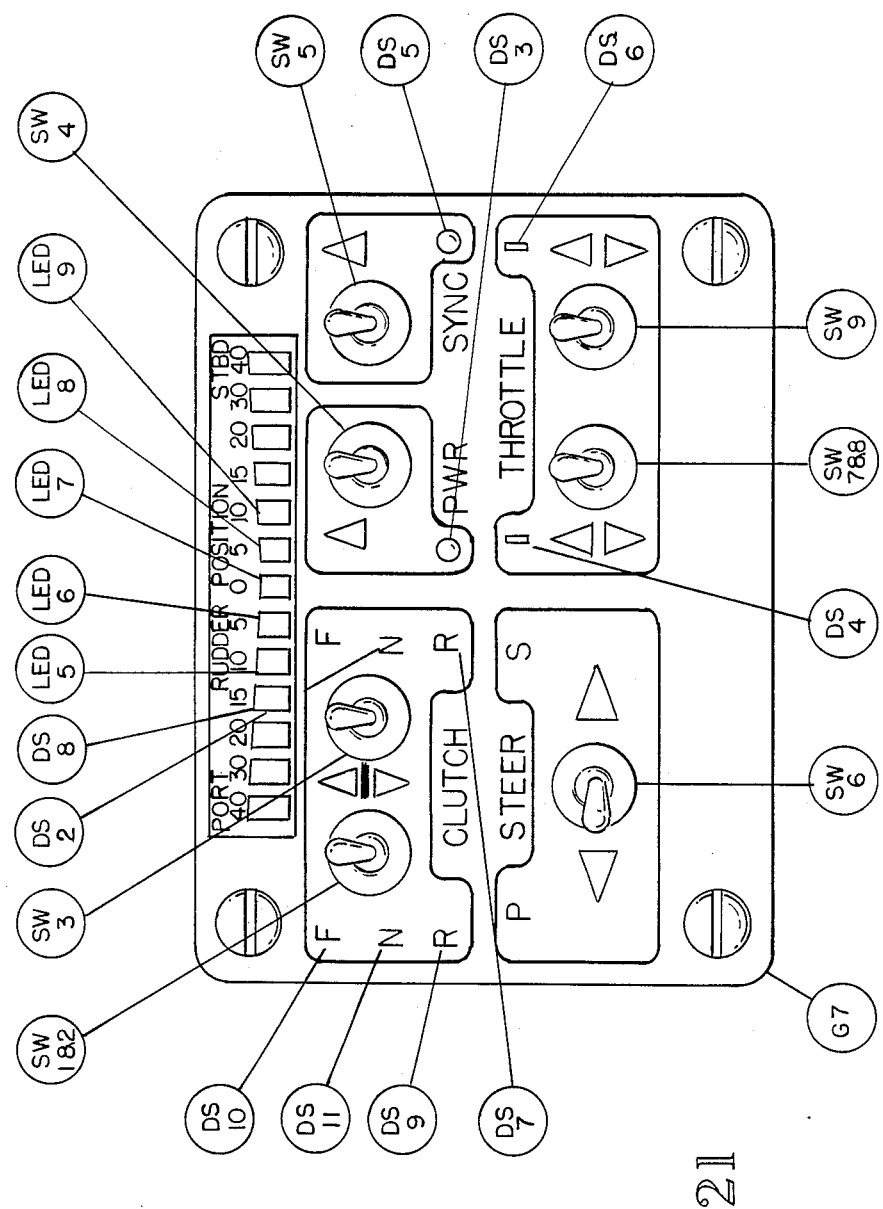
FIG. 21: is an illustrative view of portable hand held controller front panel.
Figure 22:
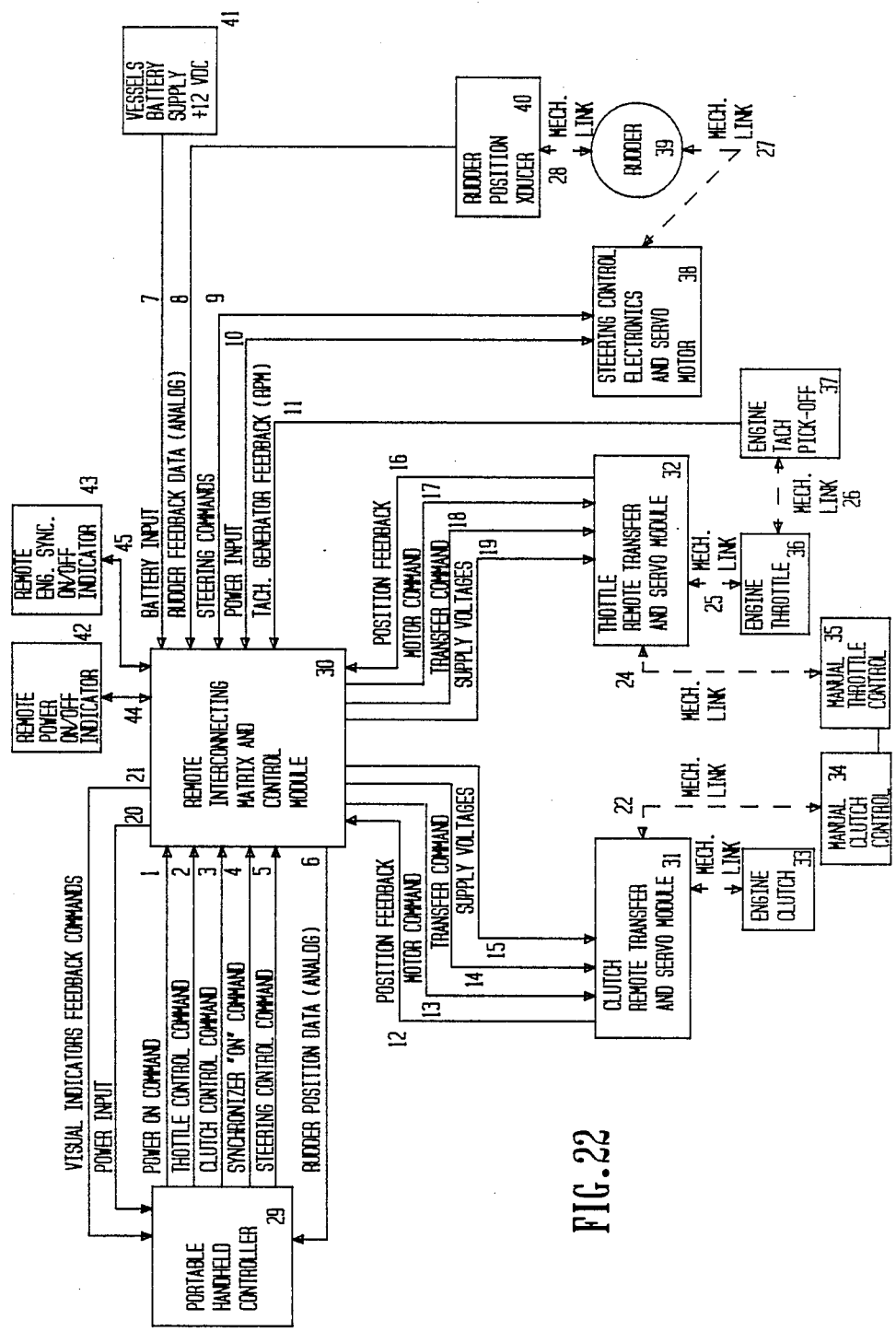
FIG. 22: is an operational/block diagram of control system.

The portable hand-held controller and monitor is shown in block diagrams 2, FIG. 1. Its functions are detailed in the block diagram of FIG. 4. FIG. 5 is an electronic schematic of the controller, FIG. 18 is an illustrative view of the controller's casting and FIG. 21 as an illustrative view of system control panel 67. The portable hand-held controller casting, 74 FIG. 18 serves as a mounting platform and protective enclosure for the system control panel, 67. FIG. 21 illustrates the preferred arrangement of the various user activated electronic control switches and indicator means on panel 67. Three sides of the enclosure project vertically upwards and from the surface of control panel 67 best illustrated in FIG. 18, provide a recess for said panel to guard against inadvertent manipulation to the system electronic control switches. A pistol like hand grip 66 projects from the bottom of the enclosure and an inverted "L" shaped hanger hook 68 is provided on the rear face of the enclosure to allow convenient hanging of the controller to the vessel. The portable hand held controller 74 is equipped with strain relief mounting 73 which facilitates entrance of a multi-conductor cable which is hard wired to the printed circuit board which in-turn holds the electronic parts and interconducting paths shown schematically in FIG. 5. The strain relief mounting hold 73 provides for attaching a standard off-the-shelf strain relief to protect cable 46 as it exits hand grip 66. As explained previously, with reference to FIG. 1, cable 46 exits hand grip 66 of the portable handheld controller 74, both shown in FIG. 18. A convenient length of the cable is 10 (ten) feet. The cable 46 terminates at helm cable plug 42, a multi-pin plug means which in-turn connects to a remote socket connector 43 on the bulkhead and interconnecting cable 39. Cable 39 terminates at remote interconnecting matrix and control module 25, FIG. 1.

The portable hand-held controller control system panel 67, shown in FIG. 21, has mounted thereon a total of seven user actuated electronic control means or switches, ten indicator means or lamps and a rudder angle display. To activate the control system, power switch SW4, schematically shown on FIG. 5 is moved momentarily forward, the direction of movement indicated by arrows on control panel 67, FIG. 21. Power switch SW4 is a single-pole, single-throw, momentary on toggle switch and serves to generate a logic-0 electronic signal. Since logic levels are referenced throughout the context of this invention, voltage levels of zero volts are a low or a logic-0 , while voltage levels of +8.0 vdc, or Vs are binary representations of a high or logic-1 . When power switch SW4 is held momentarily in the on position, a logic-0 is cabled to the remote interconnecting matrix and control module 25. As will be explained in greater detail in the power supply module discussion, the logic-0 causes a flip-flop to change state which in turn causes a remote operated switch to close. As this switch closes Vsw, (+12 vdc switched) will be applied to the system. Referencing FIG. 5, Vsw will appear at edge connector input port number 7 and light lamp DS3 power on indicator thereby providing visual confirmation of system status.

The vessels clutches and shift apparatus are controlled by clutch switches, FIG. 5, SW1/SW2, for port engine drive train and SW3 starboard engine drive train. The clutch or shift switches SW1/SW2 and SW3 are single-pole, double-throw, center-off, on-off-on switches. Being on-off-on, once placed in a given position they will remain in that position until they are deliberately moved to another position. Placing either SW1/SW2 or SW3 in a forward position connects the movable, center switch contact 2 to the fixed contact 1. The logic assignment for forward shift is a logic-0 (O vdc) as contact 1 is connected to input port edge connecting number 6, which is at ground potential. Placing the port clutch switch SW1/SW2 or the starboard clutch switch SW3 in a reverse position connects the movable, center switch contact 2, to the fixed contact 3. The logic assignment for reverse shift is a logic-1 (+8 vdc) as switch contact 3 is connected to edge connection input port number 9 which is attached to Vs or +8 vdc. The center-off clutch position is the quiescent state. Unlike the other switches schematically shown in FIG. 5, the circuitry in the clutch control modules 29 and 31 illustrated in block diagram FIG. 1 treats a quiescent input as a command to actively move the vessel's shift apparatus away from a forward gear engagement position or away from a reverse gear engagement and returns the shift apparatus to a neutral position. An explanation in greater detail will be discussed later in the clutch control module description. The logic command signal from SW1/SW2 appears at edge connection output port number 3 while SW3 appears at edge connection output port number 4. These input ports are attached to appropriate individual wires within interconnecting cable 46 illustrated on FIG. 1 and terminate at the helm cable plug connector 47 FIG. 1. Shift status indicators grouped around each clutch switch provide visual feedback information to verify shift apparatus position. Shift status indicator DS10 when lit indicates that port shift apparatus is in forward. Shift status indicator DS1 when lit indicates that port shift apparatus is in neutral and when shift status indicator DS9 is lit indicates that port shift apparatus is in reverse. When shift status indicator DS8 is lit it means that the starboard shift apparatus is in forward and when shift status indicator DS7 is lit it indicates that starboard shift apparatus is in reverse, while DS2 being lit indicates that shift apparatus is in neutral. A more detailed explaination will be discussed later in the clutch control modules 29 and 31 block illustrated in FIG. 1.

The throttle commands, one for the port engine and one for the starboard engine, are controlled by throttle switches SW7/SW8 for port and SW9 for starboard. SW7/SW8 and SW9 are single-pole, double-throw, center-off, momentary contact switches. Logic assignments for throttle switches SW7/SW8 and SW9 are logic-1 (+8 vdc) which advances the throttle, and logic-0 (ground or 0 vdc) which retards the throttle. As before, the center-off, position is the quiescent state which the circuitry in each throttle control module which is treated as a command to maintain present position. Idle indicator lamps DS4 port, and DS6 starboard, are provided to verify when the engines have reached true idle speed, thereby allowing the operator to release throttle switches SW7/SW8 and SW9 from their retard position. Operator knowledge of when true idle is reached is also important because the clutch control modules 29 and 31 will not respond to operator input commands until the engines are at true idle. Steering control is provided by steer switch SW6 schematically shown in FIG. 5 which is a single-pole, double-throw center-off, momentary switch. In FIG. 21 triangle shaped arrows are displayed beside the steer switch, indicating the direction of switch movement required to produce port or starboard steering action. Since steer switch SW6 is a momentary on with center-off switch, it is well adapted to the dodge steering technique because releasing the switch allows it to spring return to its center-off, quiescent state. The starboard side of steer switch SW6 is connected to +8 vdc which in this preferred embodiment of the invention corresponds to the digital electronic signal level of logic-1 . The port side of steer switch SW6 is connected to the ground potential, or 0 vdc, which corresponds to the digital electronic signal level of logic-0. When steer switch SW6 is in its center-off position, it is said to be in its quiescent position, and treats this as a command for the vessel's steering apparatus to remain in its then present position. Thus, three output commands are possible from steer switch SW6 i.e., logic-1, logic-0, and quiescent.

Automatic dual engine synchronizer engagement and disengagement is controlled by SW5 schematically shown in FIG. 5. switch SW5 is a single-pole, single-throw, momentary switch which serves to generate a momentary logic-0. As will be explained in greater detail later when discussing the theory of operation of the Auto-Engine Synchronizer, module 32 shown in system block diagram FIG. 1, the logic-0 causes a flip-flop to change state which in-turn engages an electronic switch to activate the automatic engine synchronizer module 32. The output of the flip-flop also causes an electronic switch to contact ground thereby placing a logic-0 on edge connector input port number 16 schematically illustrated in FIG. 5 and lighting DS5 the synchronizer o the indicator giving visual feedback that the automatic engine synchronizer is on.

Rudder Angle Indicator 17 operates in conjunction with the autopilot interface and steering module 33 and the rudder angle transducer 18 illustrated in FIG. 1. As steering commands are given by pressing steer switch SW6, these logic command signals are connected to edge connector input port 1 schematically represented in FIG. 5 where they are conducted to within cable 46 and helm cable plug 47 FIG. 1. Remote socket 43 joins with helm cable plug 47 to provide a disengageable connection to couple the steering command signal to the interconnecting cable 39 whic terminates at terminal block TB11, port 9, where it is bussed to module input port 1 of the RA1/autopilot module P3 illustrated in matrix schematic FIG. 6 to interface with steering input pin 1 of the autopilot interface and steering module 33 schematically shown in FIG. 12. Further in this discussion the operation of steering interface module 33 will be duscussed. At this time the steer command simply directs the system's power steering drive and servo motor 15 diagramed in FIG. 1 to move the vessel's rudder. The servo motor is mechanically linked to the steering apparatus to move the rudder. The resultant rudder movement is sensed by a rudder transducer 18, FIG. 1 as an analog voltage information in a format of approximately 50 MV per degree of rudder movement. As shown schematically in FIG. 5, this data is cabled to the portable hand held controller, at edge connector input on port 8. The rudder position data is conducted through a 1K ohm resistor to the inverting inputs of comparators schematically labeled AR1 through AR6 and the non-inverting inputs of angle comparators schematically labeled AR7 through AR12. Each comparators opposite input is tied to a resistive ladder network which establishes a 250 mv window between each comparators turn-on point. In the rudder amidship condition, or that point where the rudder is in line with the vessels keel and steering a straight course, the rudder position is one-half the source voltage (Vs +8.0 vdc) or +4.0 vdc. A 4.0 vdc signal imposed upon edge connector input port 8 FIG. 5, corresponds to the center of the ladder network dividers. In the amidship position, all comparetors outputa are in a logic-1 state, with comparitors AR6 pin 13 and AR7 pin 1 at a logic-1. The outputs of AR6 and AR7 are the input logic 1 state, IC3 input pin 8 and 9 of a quad 2-input "nand" gate.

With both inputs of IC3 at logic-1, IC3 outputs at its pin 10 is a logic-0 therefore causing current to flow through resistor R4 and the amber colored centrally located zero indicating LED-7 to indicate amidship direction. As the input rudder position voltage level increases an additional port LED will light sequentially every 250 mv above 4.0 vdc. At 4.25 vdc the output of comparator AR6 will go low to a logic-0 at which time current flows through LED-6, a red LED to indicate a 5 degree rudder change. At 4.50, comparitor AR5 will conduct current and light LED-5, a red LED to indicate a 10 degree rudder change. This will continue until all red colored port LED's are lit to indicate a 40 degree to port rudder angle. The same action takes place when the rudder position goes below 4.0 vdc except that at every 250 mv less, a starboard green LED is lit.

As shown schematically in FIG. 5, there are a total of thirteen input conductors and seven output conductors connected to the portable hand held controller 2 FIG. 1 through controller interconnect cable 46. The seven output connections are command logic signals from the throttle switches SW7/SW8, starboard throttle switch SW9, port engine clutch switches SW1/SW2, starboard engine clutch switch SW3, steer switch SW6, synchronizer switch SW5 and power switch SW4. Input signals are spread between power and indicators. The ground potential or 0 vdc input is conducted at edge connector input port 6, shown schematically in FIG. 5. The system's power supply is connected to one side of each command switch to provide the logic-0 command as well as indicator's, DS1, DS2, DS3, DS4, DS5, DS6, DS7, DS8, DS9, and DS10. Vsw (+12 vdc) is conducted to edge connector input port 7, FIG. 5 to power rudder angle indicator LED-1 through LED-13 and indicators DS1 through DS10. A third input of 8.0 vdc or Vs is conducted to edge connector port 9 FIG. 5, from the system power supply and is connected to one side of each command switch to provide the logic-1 command. The +8 vdc is also connected to the top of the ladder resistor network at the lead resistor indicated on the FIG. 5 schematic as R5.

Connected to the remote interconnecting matrix and control module 25 are both terminals of the vessel's battery power 24 of FIG. 1 which serves as the electrical power for the control and monitoring system.

Figure 2:
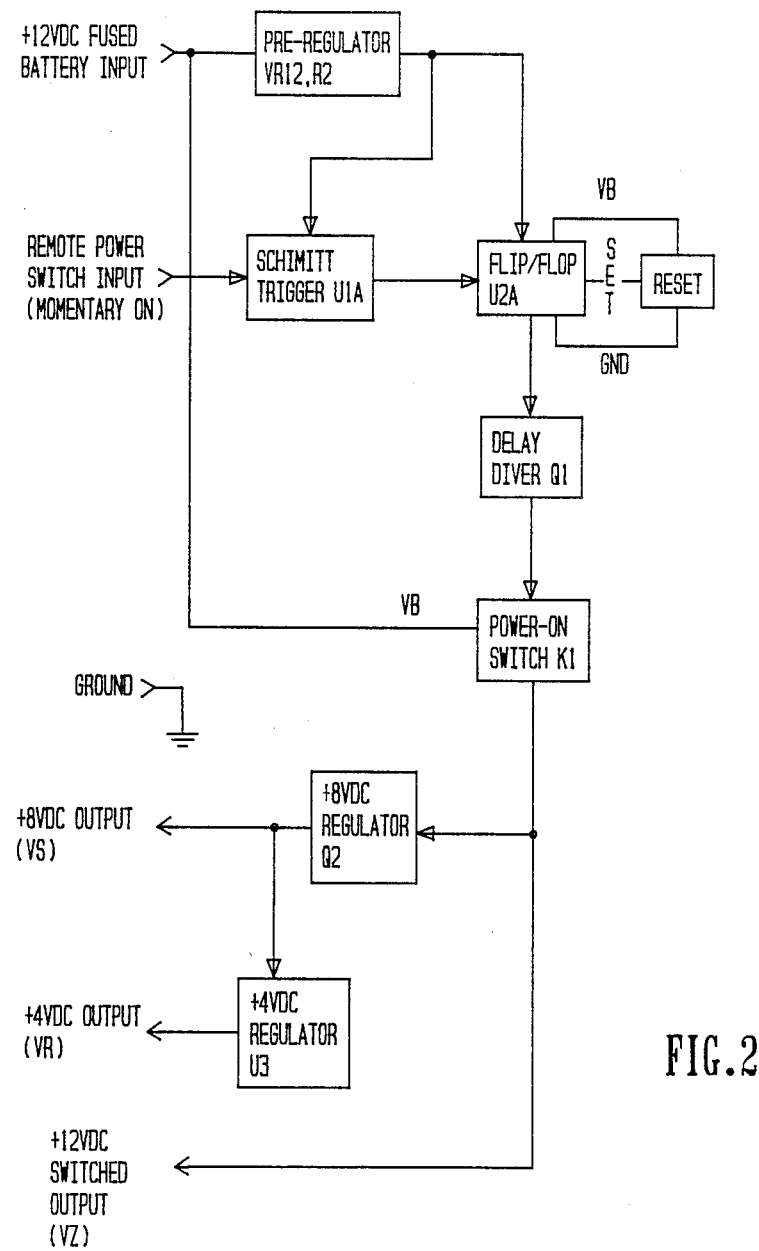
FIG. 2: is a block diagram of the power supply module.

Contained within interconnecting matrix and control module, is remote power supply module 27 which samples, through fuse F-1 (FIG. 6) and pre-regulator, the vessels battery input voltage. A power supply block diagram is presented as FIG. 2. A schematic of the power supply module is presented as FIG. 3. Power supply module 27 is termed a remote controlled power supply from the stand point that the design concept facilitates turning the system on or off at any remote station whether cabled or not cabled. While this circuit is not unique, the advantages offered over conventional hard wired, manually operated power switches are numerous. The ability to unplug the cabled portable hand held controller 2, FIG. 1, and not interrupt the power source is one example.

Referring to FIG. 3 components R2 and VR12 preregulate components U1 and U2 to assure that the input voltage does not exceed specified capabilities of each I.C. The battery voltage, VB (+12 vdc) is always present at the preregulator and is sensed as a logic-1 on pin 1 of U1 due to the pull-up resistor R1. Capacitor Cl filters any possible negative pulses which may be present on the battery line. To assure that the system comes up in a power off status when battery power is first applied to the system, and R-C network comprised of C8 and R11 is connected to pin 6, the set input of component U2. The instant battery voltage VB is applied, the preregulated voltage begins to rise on pin 14 of U1 and U2. At the same instant pin 1 of U1 begins to rise due to pull-up resistor R1. Because of the charge rate of Cl, the pull-up voltage on pin 1 of U1 lags the preregulated voltage by a few microseconds. U1 being a common schmitt trigger and inverter, its output at pin 2, starts going low to a logic-0 but is delayed behind the preregulated voltage due to Cl's charge rate. The output of U1 at pin 2 is directly coupled to pin 3, the clock input of U2. U2 being a standard "D" flip-flop" can assume an output of a logic-1 or 0 if the set input pin 6 is held low. By pulling the clock input, pin 3 low with resistor R10 and allowing the set input, pin 6 to come up high at the same time the preregulated voltage is coming up high and then pulling low by R11 the output of U2, pin 1 will always come up in the logic-1 state.

System power on/off switch is best shown in FIG. 5. By pressing power switch SW4 momentarily, the connecting of switch contact 1 to contact 2 generates a logic-0 or ground potential that is applied through interconnecting cable 46 to helm cable plug 47 and remote socket 43 which in turn connects to interconnecting cable 39. Interconnecting cable 39 is terminated at TB9, FIG. 6 the input terminal port of the interconnecting matrix and control module which then connects to input port 3 (power switch) of the remote power supply module FIG. 3. This logic-0 at input port 3 is imposed on pin 1 of U1 where it is inverted causing output pin 2, which is directly connected to U2 pin 3, to go to a logic-1 state momentarily. The not Q ($\bar{Q}$) output, pin 2 of U2 is directly connected to D1 pin 5, the data input terminal of U2, which is used for toggle applications. Therefore, the logic level-0 present at the "D1" input, pin 5, is transferred to the Q, output, pin 1 during the positive going transition of the clock pulse, pin 3. The logic level-0 now appears on the base of Q1 causing its collector to change states and go to a logic-1 and energize K1, a T-50 relay shown schematically in FIG. 6. K1 is the "power on" relay and being energized, closes the movable contact 5/3 to the normally open contact 2 which is directly connected to the battery voltage through fuse F1. With the closure of K1, the switched voltage Vsw is applied to input port 6 of the remote power supply module (FIG. 3). The switched battery voltage, Vsw passes through a pie filter which is made up of components C3, L1 and C4 and appears at the input of precision 8.0 volt regulator, Q2. The precision regulator Q2 provides the 8.0 vdc source voltage, Vs for all systems electronics. The importance of this design concept is the ability to turn the system on or off from any location as well as the ability to disconnect and connect the hand held controller 2, without disrupting the system operation.

To turn the system off, press the power off/on switch SW4 FIG. 5 located on the remote hand held controller 2, by pressing SW4 a second time, a second logic-0 pulse is generated. This pulse is transmitted from SW4 through cable 46, plug 47 and socket 43 to cable 39 which terminated in the interconnecting matrix and control module 25 bussed to pin 3 of the remote controlled power supply module FIG. 3 where it appears as a logic-0 on pin 1 of U1 a schmitt trigger. The output, pin 2 is inverted to a logic-1 pulse which acts as a clock pulse on pin 3 of U2. The not Q ($\overline{Q}$) output, pin 2 of U2 is directly connected to the data input terminal, D1 pin 5 of U2 which is used for toggle applications. Therefore, the logic-1 level present at the "D1" input, pin 5, is transferred to the Q output, pin 1 during the positive going transition of the clock pulse of pin 2. The logic-1 level appearing at pin 1 is connected to the base of Q1, causing the collector to go low to a logic-0 and therefore deenergizing K1 (FIG. 6) causing the common contact at pin 5/3 to break contact with pin 2 the normally open contact thus shutting off battery power to the complete system.

With system power back on, through the closing of the normally open contacts of K1, battery voltage, Vsw (+12.0 vdc) is applied to the +12 vdc bus lines as shown in FIG. 6. The Vsw buss is directly connected to the throttle and clutch terminal ports TB4, TB5, TB6 and TB7, where remote transfer interconnectcables, designated as 52, 53, 54, and 55 per FIG. 1 are terminated. Cables 52, 53, 54, and 55 are routed to their respective remote transfer module connectors 52A, 53A, 54A, and 55A where they are connected.

Figure 15:
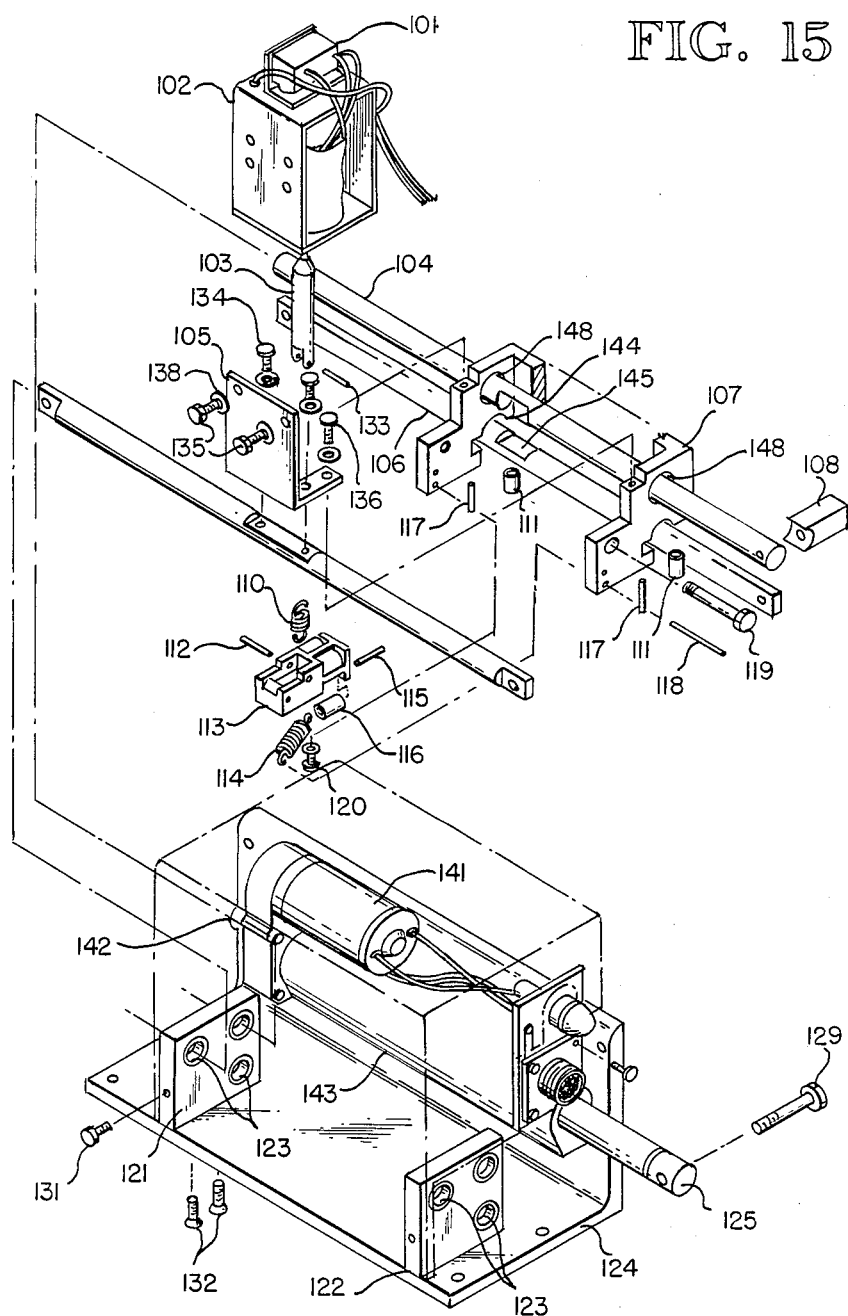
FIG. 15: is an exploded view, illustrating the construction of the remote transfer module.

Referring to FIG. 15, an exploded view illustrating the construction of the remote transfer module, each interconnecting cable will attach to connector 26 on its respected remote transfer module. The switched battery voltage, Vsw, inputs through pin 3 of connector 26 to one side of solenoid 102, while return side of solenoid coil 102 is terminated at pin 1 of connector 26 and returns to the interconnecting matrix and control module to terminate at battery ground. With Vsw (+12.0 vdc) present at solenoid 102 the electromagnetic field generated by Vsw pulls solenoid plunger 103 inward to its seat point at which time plunger 103 contacts microswitch 101, a solenoid power reduction switch, to reduce total required currect by a factor of 80%. This is accomplished by the normally closed contact of switch 101 shorting out 80% of the coil of solenoid 101. As plunger 103 contacts micro-switch 101, the normally closed contacts open, increasing coil resistance thus decreasing total currect and placing solenoid 102 in a hold status. Solenoid plunger 103 is attached to plunger spring 110 by plunger roll pin 133. The opposite end of plunger spring 110 is attached to swing arm 113 by roll pin 112. Swing arm 113 pivots on swing arm pivot screw 119 and anti-rotation slide block 107. Swing arm 113 is pulled down by swing arm return spring 114 which is attached to swing arm 113 by return spring mounting bolt 120. Return spring 114 exerts pull down pressure through its mounting to anti-rotation slide block 107 by spring return roll pin 118. It can be seen that when solenoid 102 is energized, solenoid plunger 103 will be attracted upwards by the electromagnetic field. As solenoid plunger begins moving up, plunger spring 110, having two times ($\times 2$) the pull torque of return spring 114 will start moving swing arm 113 at approximately the same rate of travel, therefore expanding return spring 114. Solenoid plunger 103 will continue to exert its upward pull until it reaches its seat at which time it will contact the solenoid power reduction microswitch 101 opening the normally closed contacts and placing solenoid 102 in a hold status.

Remote transfer module (RTM) mounting plate 124 is a standard aluminum extrusion which has been machined to meet the needs of this invention. RTM mounting plate 124 serves as the major mounting surface for mounting major assemblies, as well as it serves as the mounting means for the completed remote transfer module.

Slide blocks 121 and 122 are mounted to the inner surface of RTM mounting plate 124 by four (4) flat head, counter sunk mounting bolts 132. Pressed into the slide block are six slide bearings 123 which offer output transfer rod 109, input transfer rod 106 and motor transfer rod 104 a frictionless track within which to slide.

Anti-rotation block 107 has slide bearings 148 pressed in to offer a frictionless track within which motor transfer rod 104 can slide. Anti-rotation bearing 111 is installed and held in position by anti-rotation bearing pin 117. Anti-rotation bearings 111 press against the flattened slide of input transfer rod 106 so it cannot rotate and misalign locking detent 145.

Swing arm 113 has 4 needle bearings 116 held in position by 4 bearing pins 115. Needle bearings 116 provide rolling surface for swing arm 113 as it comes in contact with motor transfer rod 104 and input transfer rod 106. Swing arm 113 with bearings and plunger spring 110, plunger spring roll pin 112, swing arm return spring 114 and return spring mounting bolt 120 form the swing arm assembly. Solenoid plunger 103 is attached to the plunger spring 110 by plunger spring roll pin. The swing arm assembly with solenoid plunger 103 are mounted to anti-rotational slide block 107 by swing arm pivot screw 119. Anti-rotational block 107 with mounted swing arm assembly is placed between left slide block 121 and right slide block 122 and held in position while motor transfer rod 104 is aligned and inserted through bearings 146. Motor transfer rod 104 is rotated until locking detent 144 is facing down. Input transfer rod 106 is inserted through bearing 123, and past roller bearing 111. Raising swing arm assemble up into motor transfer rod locking detent 144, allows room for input transfer rod 106 to pass beneath and be inserted through bearing 123. Input transfer rod is positioned so locking detent 145 is positioned below swing arm 113. The output transfer rod 109 and the solenoid mounting bracket 105 are assembled together by bolts 134. This assembly is attached to the anti-rotation slide block 107 by bolts 136. Solenoid 102 is slid over solenoid plunger 103 and secured to solenoid mounting bracket 105 by solenoid mounting bolts 135 and washers 138. Servo motor assembly 143 is secured to RTM mounting plate 124 by bolt and spacer assembly 142 and to motor transfer rod by bolt 129 and motor spacer 108. Wires from servo motor 141 are connected to pins 4 and 6 of input connector 26.

Figure 17:
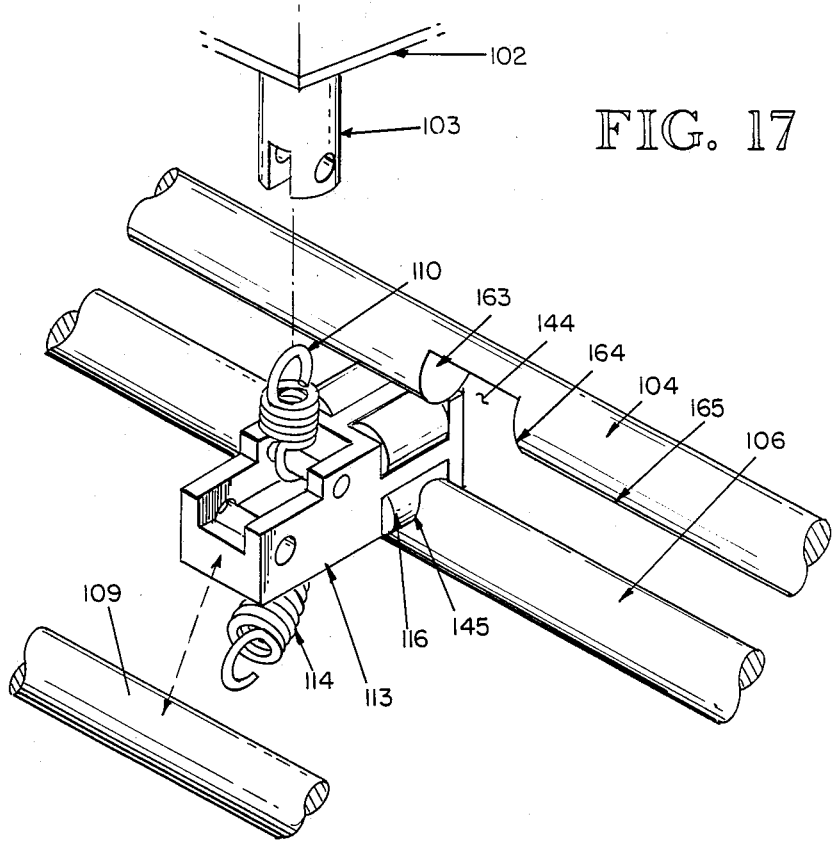
FIG. 17: is a view illustrating the position and movement of swing arm.

Referring to FIG. 17, swing arm 113 is held engaged in manual detent 145 by return spring 114 so that any movement of the input transfer rod 106 will be transmitted from the input transfer rod 106, through the swing arm assemply 113 to the output transfer rod 109. It can be visualized from FIG. 17 that with the system turned off, solenoid plunger 103 will remain in a down position, with zero pull on plunger spring 110, therefore allowing return spring 114 to hold swing arm 113 locked in the manual detent 145 of the input rod 106. Plunger spring 110 is designed to have two (2) times the pound pull as return spring 114, but has twenty-five percent (25%) less pounds pull that the hold pull torque of solenoid 110.

Figure 24:
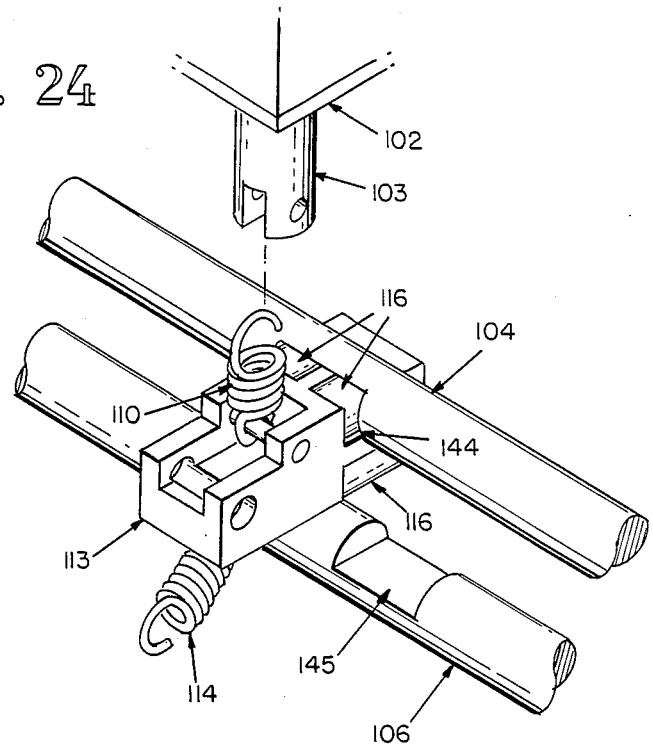
FIG. 24: is an illustrative view of swing arm engaged in motor output rod.

Referring to FIG. 24, swing arm 113 has been pulled up into the motor transfer rod 104 locking detent 144 by energizing the transfer solenoid 102 of whose electromagnetic field attracted solenoid plunger 103. The electromagnetic pull force of solenoid plunger 103 is 25% greater than plunger spring 110, therefore great enough to overcome the reverse pull of the swing arm return spring 114 to pull the swing arm into the motor transfer rod 104 locking detent 144. Referencing FIG. 17 needle bearing 116 provide a rolling frictionless travel for swing arm 113 as it approaches the 45 degree guide angle 164 which occupies 20% of locking detent area. The remaining portion of the detent wall is release tapered at 10 degrees 163 to assist swing arm return spring 114 to automatically disengage the swing arm from the motor transfer rod locking detent 144 when the solenoid 102 is de-energized. Should swing arm 113 not be aligned with locking detent 144, as shown in FIG. 17, swing arm needle bearings 116 will contact motor transfer rod lower surface 165. This action will stop the upward motion of swing arm 113, however, the pull force of solenoid plunger 103 exceeds that of solenoid spring 110, therefore, the solenoid plunger 103 will continue its travel until said plunger 103 has seated and contacted micro-switch 101 FIG. 15. The "hold" pull force of the solenoid spring 110 FIG. 15 is sufficient to maintain the expansion of solenoid spring 110 FIG. 17 and continue the upward force against the motor transfer rod 104. With a non-alignment condition, a command from the hand-held controller is given to advance or retard servo motor until it picks up motor locking detent 144. As the servo motor 143 FIG. 15 repositions plunger 125, which is attached to motor transfer rod 104 by motor spacer 108, that extension of, or retraction of servo motor plunger 125 will cause motor transfer rod 104 to move, thus bringing the motor transfer rod locking detent 144 in alignment with the swing arm 113. As the motor transfer rod 104 moves, the roller bearings 116 provide a rolling frintionless surface even though the swing arm 113 is being pulled tight against the surface of transfer rod 104. Referencing FIG. 17, it may be noted that the 45 degree guide angle 164 aids the swing arm 113 to roll into the locking detent 144. As the swing arm 113 reaches the bottom of locking detent 144, bearings 116 will contact both sides and bottom of locking detent 144 (FIG. 24). Referencing FIG. 15 it can be seen that the amount of pull force applied by solenoid 102 allows servo motor assemble 143 to apply 75 pounds force through bolt 129 and spacer 108 to the motor transfer rod 104. With swing arm 113 in full lock within locking detent 144, the force applied to the motor transfer rod 104 is transferred through swing arm 113 to the pivot screw 119, into anti-rotation block 107 which is bolted to the output transfer rod 109, which in turn is attached to an engine's throttle or clutch apparatus.

Attention is now directed to the automatic return back to manual control as well as the "hold" function which pertains to this invention. The automatic return to manual control occurs during loss of power to the system or during power shut down. Loss of power can occur due to defective wiring, battery failure or normal battery shut off procedures. Referring to the schematic of the power supply (FIG. 3) the loss of battery voltage, VB will cause Q1 to stop conducting current through K1 (FIG. 6) thus causing K1 to de-energize which in turn causes the movable contact to break contact with the normally open contact, causing Vsw to go to zero volts. The loss of Vsw, stops current flow to solenoid 102 FIG. 15 which in turn causes the loss of the electormagnetic field that held plunger 103 and swing arm assembly 113 engaged in locking detent 144 of motor transfer rod 104. With the loss of the electro-magnetic field the pull force on the solenoid plunger 103 has been eliminated, therefore the return pull force of the swing arm return spring 114 will pull the swing arm out of engagement with locking detent 144 on the motor transfer rod. If input transfer rod 106 and its locking detent 145 are aligned with the motor transfer rod 104 and its locking detent 144 the swing will instantaneously swing out of locking detent 144 and into input transfer rod locking detent 145. Should power to the system be lost or shut down with locking detents 144 and 145 not in alignment as shown in FIG. 24, then a hold mode is entered to hold the shift or throttle apparatus in place until the manual controls can be manually positioned. During the hold mode the spacing between the motor transfer rod 104, reference FIG. 24 and the input transfer rod 106, is ½ the total outside diameter of the swing arm assembly 113. As the swing arm assembly 113 disengages from the motor transfer rod 104, FIG. 24 and its locking detent 144, bearings 116 on the swing arm 113 will contact the upper surface of the input transfer rod 106 before the swing arm assembly 113 has totally disengaged from the locking detent 144. Because of this non-disengagement, the back drive gear ratio of the servo motor assembly 143 will hold the output rod 109 in place. The operator of the system, moves the manual control levels which are directly attached to input transfer rod 106. This movement of the input transfer rod 106 will position the input transfer rod locking detent 145 with the motor transfer rod locking detent 144. As the transfer of control takes place one can see, form FIG. 24, that as the input transfer rod 106 and its locking detent 145 approach the swing arm assembly 113, the swing arm assembly 113 rolls out of the motor transfer rod 104 locking detent 144, yet continues to hold the output rod 109 until it is totally disengaged. Before the swing arm assembly 113 has disengaged from the motor transfer locking detent 144 it will have engaged the input transfer rod locking detent 145 therefore transferring the hold responsibility from the motor transfer rod 104. The swing arms assembly 113 will continue its downward movement because of the pull force of the return spring 114. Movement will continue until the swing arm bearings 160 reach the bottom of the input transfer rod locking detent 145 at which point the control of the apparatus is now under manual control.

Figure 16:
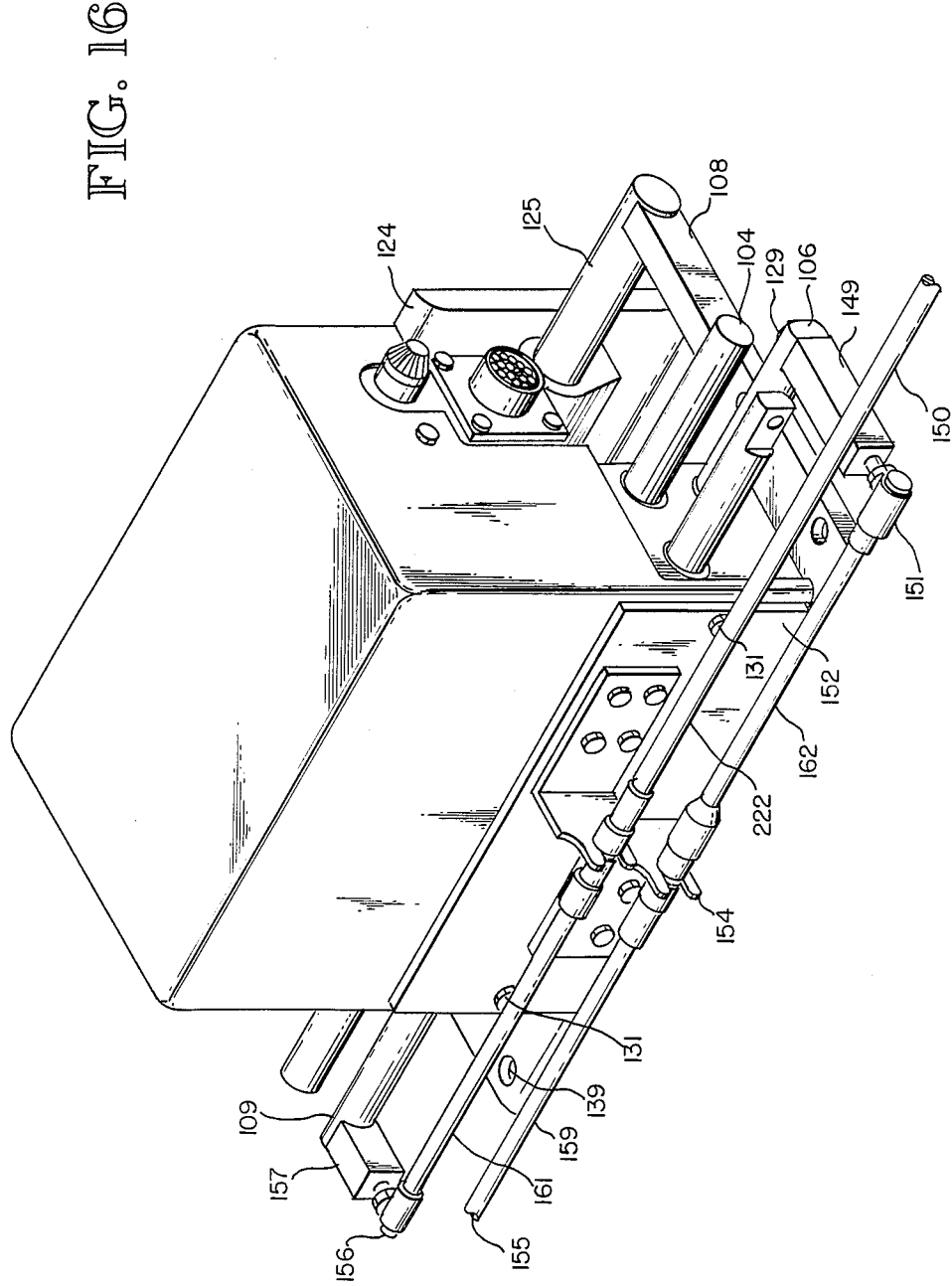
FIG. 16: is a view illustrating the use of the remote transfer module.

FIG. 16 illustrates how the remote transfer module is integrated into a mechanical push/pull cable control system. The RTM, (remote transfer module) is mounted close to the apparatus that is to be controlled. The apparatus being controlled may take the form of a throttle, clutches, or light duty steering apparatus. While FIG. 16 shows push-pull cables being integrated into the system, integration is accomplished in the same manner whether the manual control system is mechanical push/pull cables, hydraulics, pneumatic or cable over pulley.

Mounting of the remote transfer module, is accomplished by bolting the RTM mounting plate 124 to a prepared mounting surface such as a pre-fabricated mounting bracket. The RTM mounting plate 124 can be mounted 6 to 24 inches from the apparatus to be controlled. Secured mounting of the RTM mounting plate 124 is accomplished by using 4 mounting holes 137. Installation involves disconnecting the existing manual control system, cable 155 from the apparatus being controlled. With the remote transfer module mounted, the cable mounting bracket 152 with two cable mounting brackets 154 are bolted in place and secured to the side of the remote transfer module with two bolts 131. The input cable, referred to earlier as the manual control cable 155 is placed into the cable mounting brackets 154 and clipped into position. The universal portion of the quick disconnect ball joint 151 is threaded onto the inner push/pull rod 162. The ball end of the universal joint 151 is threaded into the input transfer rod mounting block 149 of which is in turn bolted 129 to the input transfer rod 106. The manual control cable 155 is securely mounted to the cable mounting bracket 154 by holding the outer sheath 159 of the input cable 155. Any manual movement of the inner push/pull rod 162 will result in that movement being coupled through the quick release ball joint 151 transfer block 149 and its mounting bolt 129 into the input tranfer rod 106. Assuming a down power state of operation, the manual movement of the input rod, as explained in detail previously, is transferred by the swing arm assembly 113 to the output transfer rod 109. Movement of output tranfer rod 109 is coupled through the output rod transfer block 157, to quick disconnect ball joint 156 which is threaded onto output rod 161. With output push/pull cable's 150 sheath attached to one of the cable mounting brackets 154 movement of the output transfer rod 109 is coupled through the output cable push/pull rod 161 which is attached to the apparatus to be controlled. Therefore, movement of the input rod 155 is transferred through its cooperative mechanical link into the swing arm assembly 113 (FIG. 17) where that movement is transferred to output rod 109, which through its cooperative mechanical linkage, the original input rod 155 movement is transferred to the output push/pull cable 150 which is attached to the controlled apparatus on the engine, thereby moving it.

Thus, swing arm 113 either engages input transfer rod 106 or motor transfer rod 104. Whenever motor transfer rod 104 is engaged, the conventional helm station, which operates input transfer rod 106 is disabled.

Figure 20:
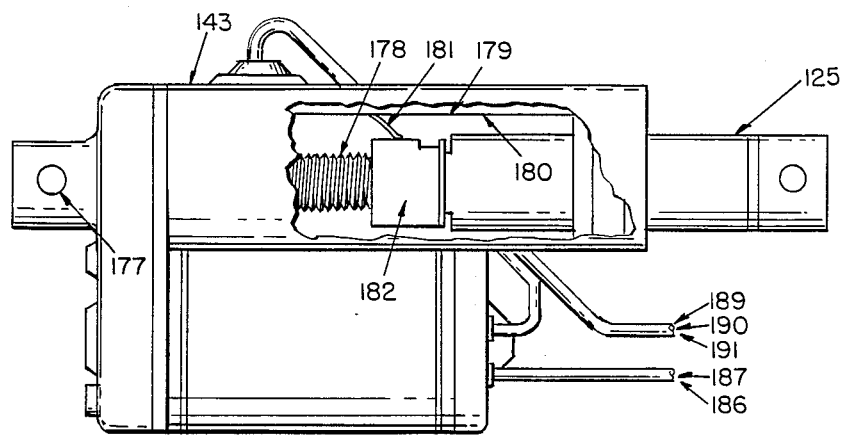
FIG. 20: is a partially cutaway view, illustrating parts of the construction of the servo motor.

The remote transfer module servo motor contruction is shown in FIG. 20. The cut away illustration shows how servo motor position is derived. While the manner in which this is accomplished is standard practice for gaining feedback information in the controls industry the method is discussed within this invention to demonstrate how servo motor position information is generated. FIG. 20 is an illustrative diagram showing the full servo motor. In operation the mounting clevis 177 is secured to the remote transfers mounting plate 124 (FIG. 15) by a bolt and spacer assembly 142. The plunger 125 secured to the motor transfer rod 104 by a bolt 129 and spacer 108. The motor within the assembly 143 is of D.C. permanent magnet configuration, having wires 186 and 187 which terminate at a male connector 26. The D.C. motor assembly 143 is mounted to a gearhead 184 which provides the drive torque to the acme screw 178. Threaded to the acme screw 178 is an anti-rotation nut and brush holder 182, which is in turn secured to plunger 125. As a positive D.C. potential is applied to the positive motor wire 186 the motor will turn in such a direction as to cause the acme screw 178 to rotate counterclockwise and cause the threaded nut and brush holder 182 to extend plunger 125 away from the motor assembly 143. The linear movement of the threaded nut and brush holder assembly 182, transfers through the brush assembly 181 a DC potential which is equal to the position of the brush assembly 181, relative to the position of the resistive element 180. Therefore, if the brush assembly 181 is positioned one-half its distance of travel, of in the center of its travel, its position is therefore in the center of the resistive element 180. Since resistive element 180 is connected as a voltage divider, the voltage from the brush assembly wiper 181 is ½ the positive potential applied to the positive element wire 191. The resistive element 180 is attached to the printed circuit board 179, to which resistive element wires 189, 190 and 191 are attached.

Referring to FIG. 15, the servo motor assembly 143 can be removed and replaced with a four inch stroke hydraulic or pneumatic cylinder. The control signals that command the servo motor assembly 143 would then be connected to a bi-directional hydraulic or pneumatic pump or solenoid operated control valves which in turn control direction and distance of travel. While hydraulics or pneumatic may be the primary control means, the use of an electro-mechanical servo is a secondary or back-up control means.

The electrical interconnection of the system is accomplished by standard off the shelf multi-conductor cables and multi-pin male-female connectors.

Figure 9:
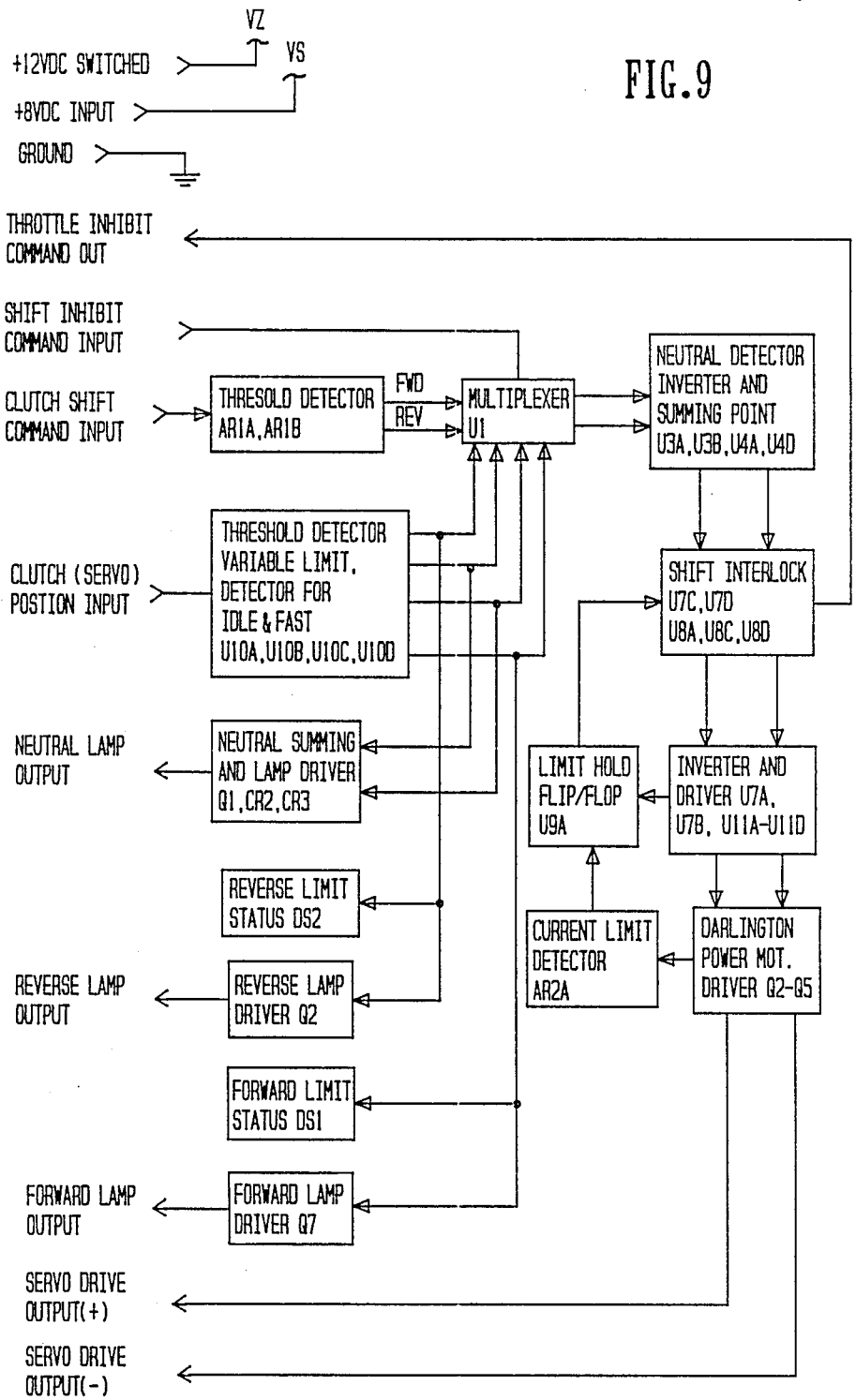
FIG. 9: is a block diagram of the clutch control module.
Figure 10A:
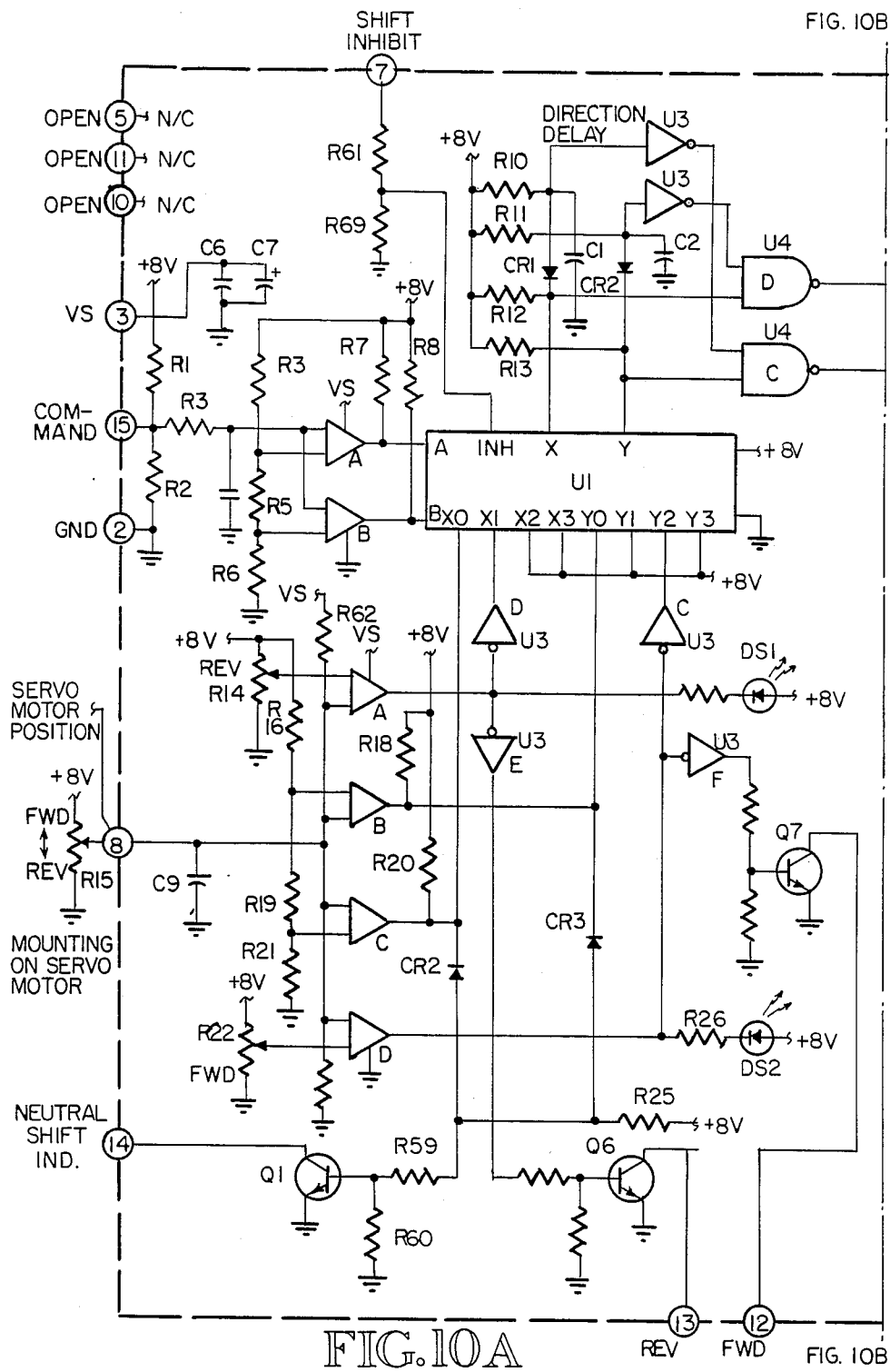
FIGS. 10A,B: is a schematic diagram of the clutch control module.

The clutch circuitry of starboard clutch module 29, and port clutch module 31 in FIG. 1 are shown as a block diagram in FIG. 9, and in a schematic diagram in FIG. 10. Two like clutch modules are plugged into the interconnecting matrix and control module to operate independently as port and starboard clutch controls. Starboard clutch module 29 is the same as the port clutch module 31, and their function will be discussed only with reference the the port clutch module 31.

At this point it is necessary to establish the status of the engines and the electronic control and monitoring system. The engines under control are running and in a neutral status. The electronic control and monitoring system has been turned on, it has assumed engine control, therefore all power such as Vs (+8.0 vdc) and Vsw (+12 vdc) are operational. With these assumptions defined and all command signals from the portable hand held controller at quiescent, the input and outputs of the clutch control module will be defined. As seen in the clutch control module schematic, FIG. 10, with referene to this the clutch control module has six output ports and six input ports. At schematic, input port 1 is switched battery voltage, Vsw (+12 vdc) while at input port 3 is supply voltage Vs (+8 vdc) and input port 2 is at ship's ground. These voltages will be familiar from previous discussions of their counterparts in connection with power supply module block diagram FIG. 2. Input port 6, receives analog position data from the remote transfer modules 12, and 14. This signal is derived from the motor position sensor means mechanically linked to the acme screw 178 inside the servo motor assembly 143. The analog voltage present at input port 6 of the clutch module will be +4.0 vdc when transmission is in neutral or the center of its forward to reverse stroke. The shift inhibit signal at input port 7, is derived from the throttle control modules 28 and 30 (FIG. 1). Input port 7 will input a logic-0 when the engine under control is at idle and will input a logic-1 should the engine RPM be increased above the pre-set idle condition. The remaining ports on the module 8, 9, 4, 14, 13 and 12 are output ports for signals generated within the clutch module. A shift command, generated by the portable hand-held controller, is inputed to the clutch control module port 15. In a neutral command status the input is a quiescent signal which is defined by two 100 ohm resistors R1 and R2, which are connected between Vs (+8.0. vdc) and ground (0 vdc). This equal divider establishes ½ Vs or +4.0 vdc at pin 15. In the neutral state the input of AR1-A pin 3, the non-inverting input is lower than the reference voltage established on pin 2, therefore, the comparator is turned off and the output is a logic-0. The output of AR1-B pin 6, the inverting input, is higher than the reference voltage established on pin 5, therefore, the comparator output is a logic-0. The outputs of AR1-B will remain at a logic-0 until a shift command is given.

The outputs of AR1-A and B are imposed on the control inputs pin 9 & 10 of U1, which is a CMOS analog multiplexer/demultiplexer. As defined previously, without a shift inhibit, the input on pin 6 of U1 is a logic-0. The input voltage to input port 6 was established previously at 4.0 vdc input port 6 was established previously at 4.0 vdc since the clutch is in neutral. Two (2) 100kohm resistors R62 and R23 are of like values and connected between +8.0 vdc and ground to form a +4.0 vdc neutral bias on one input of voltage comparators U10-A, B, C, and D. Resistor R16, 19, and 21 form a 50 mv neutral shift window within which the clutch servo motor must position the shifting apparatus so that the position feedback falls within the 50 mv window. A 100 ohm adjustable resistor R14, the reverse limit, set point is arbitrarily set at +6.0 vdc, while another 100k ohm adjustable resistor R22 the forward limit set point, is arbitrarily set at +2.0 vdc. These set points are set during installation to each boat's needs. With the shift apparatus in neutral and the input to port 6 at +4.0 vdc all outputs of U10, pin 13, 14, 1 and 2 are at Vs (+8.0 vdc) or a logic-1. Both U10-B pin 14 and U10-C pin 1 will output a logic-1 which is attached through isolating diodes CR2 and CR3 to the base of Q1 causing the collector of Q1 to go low to a logic-0. This logic-0 appears at output port 14 which interconnects within the interconnecting matrix module to interconnecting cable 39. Interconnecting cable 39 terminates into multipin remote socket 43 which mates with multi-pin helm cable plug 47 and interconnecting cable 46 which in turn terminates at input pin 2 or 5 the input to the remote neutral status indicator DS1 and DS2 in the portable hand controller (FIG. 5). One side of each status indicator is tied to +12 vdc. Therefore, with a logic-0 on input pins 2 and 5, DS1 and 2 become lit, indicating a neutral status.

With U1 control inputs, A-pin 10 and B-pin 9 low, the internal electronic switch connects Y, pin 3 to Y0, pin 1 and X, pin 13 to X0, pin 12. Both inputs Y0 and X0 are low (logic-0) because of the neutral status on U10-B and C. The logic-0 at output Y, pin 3 is connected to U4-C pin 8 and through CR2 to U3-A pin 1 where it is inverted and connected to U4-D pin 12. The logic-0 at output X pin 13 is connected to U4-D pin 13 and through CR1 to U3-B pin 3 where it is inverted and appears as a logic-1 at U4-C pin 9. U4 being a quad 2-input NOR gate, the output of U4-D and C will be a logic-0 for a neutral input. R-C networks C1, R10 and C2, R11 combine to form a delay between direction command.

The output of U4-D pin 11 is connected to U8-D pin 13 and also U7-F pin 13 where the inverted input appears as a logic-1 on U8-A pin 12. U8 is a quad 2-input NAND gate. U9 is a dual type D flip-flop and is configured along with AR2-A and U7-D as a current limit resetable switch. An assumption shall be made that a current limit does not exist in the output drive circuit, therefore, the output of AR2-A pin 1 is a logic-1 which U7-D inverts to a logic-0 and inputs this signal to U9-A pin 6 as a set input. With the set input low (logic-0 ) the reset input can go high or low and the ($\overline{Q}$) output pin 2 will remain at logic-1. Should the set input U9 pin 6 go high and the reset input U9 pin 4 go low indicating a drive command, ($\overline{Q}$) will go low and inhibit motor drive signals at U8-C and D. With U8-D pin 13 at logic-0 and pin 12 at logic-1 the output at pin 11 will be a logic-1. This logic-1 is inverted by U7-B and appears through R44 as a low on the input of U11-B pin 6. U11 is a quadruple high-current darlington switch which drives the output power transistors. U8-A, input pins 1 and 2 are both logic-1's, therefore, with like inputs U8-A will output a logic-0 of which is connected to output port 4, the throttle inhibit. This output is normally a logic-0 except during the actual shift period, at which time it will change to a logic-1. The logic-1 at output port 4 will remain as an inhibit to any throttle movement until the shift cycle has completed. The output of U8-A pin 3 is also connected through a blocking diode CR11 to R51 and C5 which make up a short R-C time constant to pin 5 of U7-C. The inverted output, a logic-1 is connected to U9-A pin 4 to act as a rest pulse, and through R45 to U11-D pin 14 and through R49 to U11-C pin 11. The logic-0 imposed to U11-B pin 6 and U11-A pin 3, results in outputs of which are equal to Vsw or +12 vdc. This high is coupled through R43 and R41 which serve as current limit resistors. R42 and R58 are pull up resistors for the base of Q2 and Q3, which are 10 amp PNP power darlingtons. The output of Q2 and Q3 are low or diod drop above ground. With the inputs of U11-D and C a logic-1, their outputs will be low or equal to the collectors of Q2 and Q3. With Q2 and Q3 biased off, Q4 and Q5 collectors are also low, and no current will flow through the motor drive circuit, therefore, output port 8, motor positive and 9, motor negative are low.

With a forward shift comman given, clutch switch SW1/SW2 (FIG. 5) is pressed forward causing movable switch contact 2 to come in contact with contact 1. Contact 1 is at ground potential, therefore pulling the quiescent control potential of 4.0 vdc down to ground or a logic-0. The logic-0, forward shift command is connected through edge connector output port 3, (FIG. 5) to cable 46 helm cable play 47 and remote socket 43, interconnecting cable 39 through the remote interconnecting matrix and control module to the input command, port 15 on the clutch control module FIG. 10. With a forward command given the logic-0 at the input command port 15 will be seen at the inverting input, pin 6 of AR1-B as a voltage lesser than the reference voltage established by 10k ohm resistors R4, 5 and 6 on the non-inverting input 5 AR1-B. The output of AR1-B, pin 7 will swing from a logic-0 to a logic-1 and remain in that state until the clutch switch is returned to neutral or reverse position. AR1-B pin 1 will remain at logic-0 as the input command signal was less than the reference potential established on pin 2. U1 control input B, pin 9 will change to a logic-1 while U1 control input A, pin 10 will remain at a logic-0. U1 being an analog multiplexer/demultiplexer, digitally controlled switch Y pin 3 will output signals from Y2 pin 2 while X pin 13 will output signals from X2 pin 15. Input Y2, pin 2 receives a logic-0 from inverter U3-C pin 6, the input of which, pin 5 is attached to forward limit detector U10-D pin 2. As explained previously, U10-D is in a non-limit state and outputs a logic-1. This logic-1 is inverted by U3-C and appears as a logic-0 on U1 output Y pin 3. Input X2 pin 15 is attached to Vs (+8.0 vdc) which represents a logic-1 and appears at output X pin 13. The logic-1, U1 pin 13 is inverted by U3-B and also appears at U4-D pin 13 as a logic-1. The logic-0 at U1 pin 3 appears at U4-C pin 8. With a logic-0 on pins 8 and 9 of U4-C the output pin 10 will be a logic-1. U1 pin 3 an output of logic-0 which is inverted by U3-A and appears as a logic-1 at U4-D pin 12. With a logic-1 on pin 12 and 13 of U4-D the output, pin 11 will be a logic-0. This logic-0 is connected to input pin 13 of U8-D and is inverted by U7-F to appear as a logic-1 on input pin 2 U8-A. The logic-1 on pin 10 U4-C is imposed on input pin 9 of U8-C and is inverted by U7-E to appear as a logic-0 on pin 1 of U8-A. With a logic-0 on input pin 12 and 13 the output of U8-D will be logic-1 which inverted by U7-B to appear through R44 as a logic-0 on the input of U11-B pin 6. The output of U11-B pin 8 will remain at Vsw or +12 vdc to bias-off Q2 and leave its collector low which is tied to output port 9 the negative side of the servo motor. With a logic-1 on pin 2 and a logic-0 on pin 1 of U8-A, the output of U8-A pin 3 will change to a logic-1. This signal is delayed then inverted by U7-C and appears as a logic-0 on the input of U11-D pin 14 and U11-C pin 11. Input pins 9 and 8 of U8-A are both at logic-1, therefore, its output will change to a logic-0 which is inverted by U7-A to appear as a logic-1 at U11-A pin 3. The output of U11-A pin 1 goes low causing the collector of Q3 to rise to Vsw (+12.0 vdc) which in turn causes current to flow through Q3 and Q4 down through R47 a current sensing resistor. The +12.0 vdc on the collector of Q3 is imposed on output port 8 the positive terminal of the servo motor, starting the motor turning in such a direction as to shift the transmission from a neutral position to a forward position. The servo motor, (FIG. 20), will continue to run until the brush holder 182 has moved the brush assembly 181 (the wiper of voltage director R15 of FIG. 10) until the wiper of the voltage divider decreases the output voltage to the threshold level of voltage comparator U10-D. As the servo motor position output voltage, present at port 6 and connected to U10-D pin 5, decreases below the limit potential pre-set on U10-D pin 4, output pin 2 will change to a logic-0 or ground potential. At the instant the threshold, or forward limit is reached the output logic-0 input to U4-C pin 8 changes to the output to a logic-0 which in turn is processed by the interlock circuit comprised of U8-D, A, C and U7-E and F. The output of U8-C changes state to a logic-1 which is inverted by U7-A to a logic-0 and changes the output of U11-A pin 1 from a low near ground potential to a high equal to Vsw (+12.0 vdc). This high causes Q3 collector to go low, stopping any further travel of the clutch shifting process. The U8-A pin 3 section of the interlock circuit also changes it's output to a logic-0 which is connected to output port 4, removing the throttle inhibit and allowing the throttle to operate. During the same time U3-C was inverting the limit signal produced by U10-D pin 2, a logic-0, has caused current to flow through DS2, an on board LED limit status indicator, and resistor R26 to indicate a limit has been reached. The logic-0 at U10-D pin 2 is also inverted by U3-F to bias Q7 into conduction causing its collector to drop to a logic-0 which is connected to output port 12, a forward shift indicator port. The logic-0 or low at output port 12, a forward shift indicator port. The logic-0 or low at output port 12 is connected through the interconnecting matrix and control module, cable 39, remote socket 43, and helm cable plug 47, and cable 46 to the portable hand-held controller where it is connected to idge connector input port 20, (FIG. 5) where the logic-0 or near ground potential causes DS10, the forward shift indicator, to become lit, indicating that the forward shift cycle has been completed and the vessel is in a forward movement.

To return to neutral SW1/SW2 (FIG. 5) is pressed to a neutral position causing movable switch contact pin 2 to disconnect from pin 1. This action causes output at port 3 to rise from a logic-0 to a quiescent potential of 4.0 vdc. As explained previously, the quiescent state is provided by R1 and R2, (FIG. 10) both of equal value resistance forming a voltage divider. The quiescent voltage causes threshold detector AR1-B pin 7 to change from a logic-1 to a logic-0 which in turn causes the control B input, pin 9 of U1 to return to a logic-0. The electronic switch reconnects Y pin 3 to Y0 pin 1 and X pin 13 to X0 pin 12. Since the previous command was a forward command and that a limit had been reached U10-D pin 2 and U10-C pin 1 are low or a logic-0. U10-C pin 1 went low as soon as the neutral window was exceeded. It is this low or logic-0 that is switched to output pin 13, inverted by U3-B to appear as a logic-1 at U4-C pin 9 and at U4-D pin 13. As can be followed in a logic flow manner U4-D pin 11 will assume a logic-1 status only during that period of time a forward command is given and a stop or neutral instruction has not been generated. Likewise, U4-C pin 10 will output a logic-1 only during that period of time a forward command is given and a stop or neutral insturction has not been generated, therefore, when a reverse command has been given U4-C pin 11 will be high and U4-D pin 10 low. This command is reflected through the U8, U7, interlock and inverter to the darlington drivers which in turn causes Q2's collector to rise to Vsw (+12.0 vdc) and Q3's collector to remain at a ground potential. Q2's collector is connected to output port 9 and in turn the servo drive motor which by reversing directions has caused the transmission to be shifted from forward back into neutral. This movement back to neutral causes the wiper of R15 to return within the neutral detector window of U10-B and U10-C where the output of U10-C pin 1 changes from a logic-0 to a logic 1, which is switched through U1 to U4-D changing the output, pin 11, from a logic-1 to a logic-0. A logic-0 on U4-D 11 and U4-C is translated in a logic manner through invertor U7, interlock U8 and darlington driver U11 to bias Q2, Q3, Q4, and Q5 in such a manner to place a ground potential on output ports 8 and 9, which cause the clutch servo motor to stop in a defined neutral position. As U10-C pin 1 changed to a logic-1 this was reflected through diode CR2 to the base of Q1 causing the collector to drop to near ground. The collector of Q1 is connected to output port 14 which, as explained previously, connects through the interconnecting matrix and control interconnecting cables 39 and 46 to input port 2 edge connector of the hand controller (FIG. 5) thus causing DS1 to become lit and indicate a neutral status.

Since a basic logic flow has been defined for a forward and neutral shift, only a brief discussion will be defined for a reverse shift.

A reverse command results in a logic-1 being present at input port 15. This logic-1, which is represented by a +8.0 vdc potential, is greater than the reference potential established on AR1-A pin 2, therefore, AR1-A pin 1 rises to a logic-1 potential. This logic-1 is connected to pin 10 the A control input of U1. The logic-1 changes the electronic switches to a status where Y pin 3 is connected to Y-1 pin 5 and X pin 13 is connected to X1 pin 14. Y1 being tied to +8.0 vdc reflects this high or logic-1 through output Y pin 3 to input 8 U4-C. This logic-1 at U1 pin 3 is also inverted by U3-A and appears at U4-D, pin 12. Since R15 is in the neutral resistance region the output of U10-A pin 13 is a logic-1. This logic-1 is inverted by U3-D, switched through X1 pin 14 to X pin 13 to connect to U4-D pin 13. The output logic-0 at U1 pin 13 is again inverted by U3-B of whose output is connected to U4-C pin 9. Like logic-0's on the inputs of U4-D cause pin 11 to output a logic-1. A logic-1 on U4-D pin 11 and a logic-0 on U4-C pin 10 are the same logic commands discussed previously when shifting from forward to neutral, therefore, reference is made to that section for the logic progression which biases Q2 collector to Vsw (+12.0 vdc) and Q3 collector to near ground. The +12.0 vdc on output port 9 as discussed previously is connected through the interconnecting matrix and control module 25 (FIG. 1), cable 53 and its associated connector to module 12 (FIG. 1) where it is terminated at the negative terminal of the clutch servo motor. A positive potential on the negative lead of the clutch servo motor causes the servo motor to rotate in such a direction as to move the shift linkage from a neutral position to a reverse position. Again, as explained previously this servo motor repositioning of the clutch is monitored by a resistive element 180, FIG. 20 which is shown as R15 in FIG. 10. Reverse movement of the servo motor causes the wiper of R15 to rise towards the positive end and thus increase the potential that is reflected on the input of voltage comparator U10. A pre-set limit, or threshold level has been set by reverse adjustment resister R14. We will assume a threshold level of 6.0 vdc has been set. This represents that point of movement where the clutch servo has engaged the reverse gears within the port transmission. At the instant the ouput of R15 rises above the pre-set limit set on pin 11, the ouput on pin 13 U10-A will drop to a logic-0. As explained previously, a logic-0 on the outputs of U4-D pin 11 and U4-C pin 10 is processed logically to the output ports 8 and 9 to stop the servo motor movement.

At that period of time that U10-A pin 13 goes to a logic-0, DS1 will light indicating that the pre-set limit has been reached. At the same time, the logic-0 is inverted by U3-E to bias Q6 into conduction causing its collector to drop to a near ground potential which is connected to output port 13. Output port 13 is interconnected by the interconnecting matrix 25, through multi-pin cables, plugs and sockets to FIG. 1 to the hand-held controller edge connector input port 19 (FIG. 5) to light DS9, indicating a reverse status.

To return to neutral, the input logic-1 is changed to a quiescent level which places a logic-0 on the A and B control inputs of U1. The internal switches of U1 connect Y to Y0 and X to X0 which results in U4-D pin 11 changing to a logic-0 and U4-C pin 10 changing to a logic-1. The logic-1 on U4-C pin 11 logically results in Q3 collector going positive to +12.0 vdc and Q2 collector remaining at ground, thus the servo motor will turn in such a direction as to move the shift linkage back to neutral. As previously defined, the servo motor's movement is resistively monitored by R15 which, in returning to the neutral position, will output a potential changing from the analog potential of 6.1 vdc to 4.0 vdc. Upon reaching 4.0 vdc the outputs of U10-A pin 13 and U10-B pin 14 will rise to a logic-1 which is coupled through Y0 to Y pin 3 to result in a logic-0 at U4-D pin 11 and C pins 10 to stop the servo drive motor in a neutral position.

Figure 7:
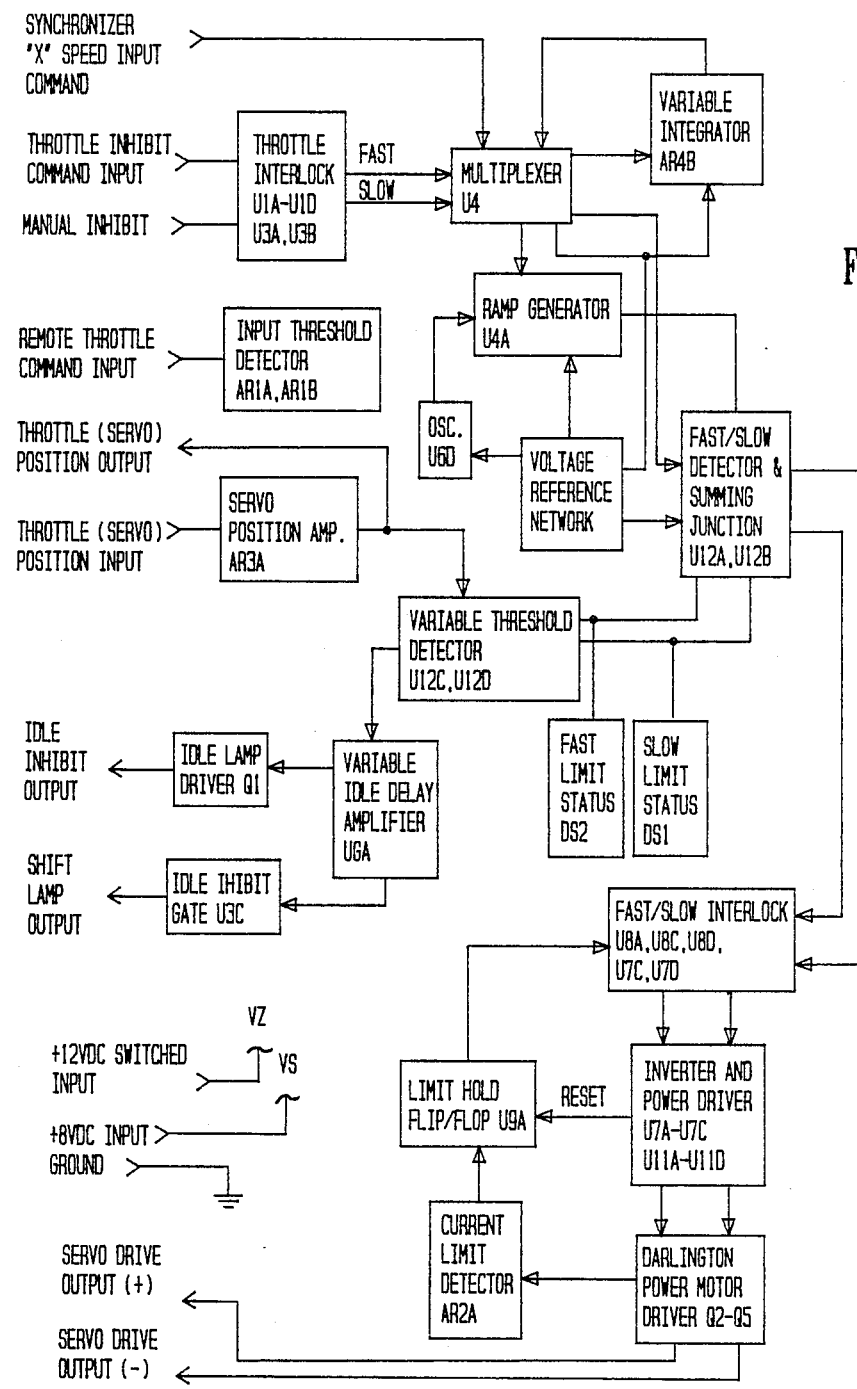
FIG. 7: is a block diagram of the throttle control module.
Figure 8A:
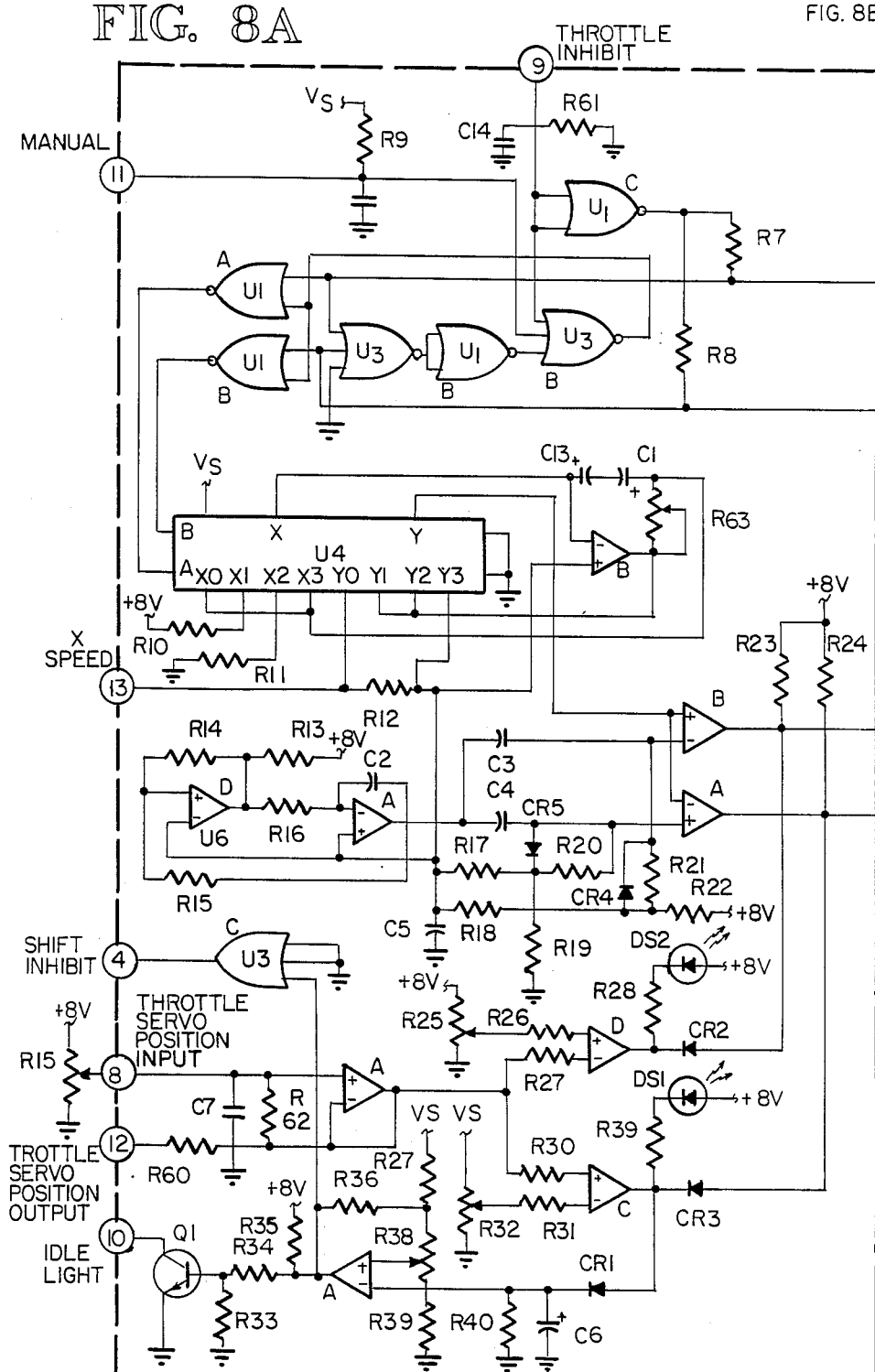
FIGS. 8A,B: is a schematic diagram of the throttle control module.

The throttle circuitry of throttle control modules 28 and 30 (FIG. 1) is shown as a block diagram in FIG. 7 and as a schematic diagram in FIG. 8. As seen in FIG. 7, a throttle control module has eight input signals and five output signals. System ground at port 14, Vs (+8.0 vdc) port 5, and Vsw (+12.0 vdc) port 1, will now be familiar from previous discussion of their counterparts in connection with the power supply and clutch control modules. Command input at port 15 is a directional logic command with a logic-1 commanding an increase in throttle setting while a logic-0 command retards the throttle setting. Throttle inhibit, port 9 has been discussed previously, however, the input is normally low, represented as a logic-0. During the shift cycle or that period of time while the transmission shift arm is in movement the throttle inhibit will be a logic-1, thus locking out any throttle commands. Once the shift cycle has completed, the signal at port 9 will once again assume a logic-0 status. The manual inhibit input at port 11 is normally high or at logic-1. A remote synchronizer on command will cause the automatic engine synchronizer module 32 (FIG. 1) to output a logic-0 and inhibit throttle commands during synchronizer control. Input port 13 x speed is an analog input signal from the automatic engine synchronizer module 32 (FIG. 1). Input port 8 is an analog signal received from the throttle servo motor, and acts as a position feedback. Idle light output port 10 is normally a logic-1 except when the engine is in an idle condition during which time port 10 will be at a ground or logic-0 potential. Shift inhibit output port 4 is derived from the same data but is output as a logic function to inhibit shifting when the engine is above an idle condition. The output port 4 will output a logic-0 during idle and logic-1 when the engine RPM is above idle. Output port 12 is a buffered analog signal to represent throttle position and rate of change. Outputs ports 7 (motor −) and 6 (motor +) are servo motor control signals.

To discuss the throttle control circuit FIG. 1 in greater detail it is necessary to establish the status of engines under control. The engines are under electronic control, the system is on and functioning, the engines have been started, are in an idle condition, and the clutch or shift command is for neutral which has been accomplished. With these basic conditions the discussion herewithin shall pertain to the port throttle control module only since the starboard control module is exactly the same circuit.

With no throttle advance or retard commands given, command input port 15 will assume a quiescent potential of 4.0 vdc as established by the voltage divider combination of like value, 100k ohm resistors R1 and R2. With the engine in neutral and no shift action in-process the throttle inhibit will be at a logic-0, therefore U1-C output pin 11 will be a logic-1 or +8.0 vdc, which in turn supplies the +8.0 vdc for resistor R7 and R8. With a quiescent input status AR1-A and B outputs, pin 1 and 7 are a logic-0. The output of AR1-A pin 1 is connected to U1-A pin 2 a quad 2-input NOR gate and U3-A pin 1 a triple 3-input NOR gate. The output of the second half of the voltage comparitor AR1-B pin 7 is connected to U1-B pin 5 and pin 2 of U3-A. The third input, pin 8 of U3-A, is tied to ground, therefore, with input pins 1,2 and 8 at a logic-0, U3-A will output a logic-1 on its pin 9. Output U3 pin 9 is connected to U1-B input pin 8 and 9 to output a logic-0 on pin 10. U3-B functions as a gate to lock-out manual throttle control when shifting and when the synchronizer is engaged and controlling the throttle. Normally pin 4 of U3-B is held at a logic-1 by a 100k ohm resistor R9, while pin 3 of U3-B is held low, logic-0 by a 47k ohm resistor R61. As explained previously, should the transmission be in the process of shifting, the throttle inhibit port 9 will be pulled high to a logic-1, thus the output of U1-C pin 11 will drop to a logic-0 and inhibit any manual throttle commands because 10k ohm resisters R7 and R8 are not tied to a +8.0 vdc potential. The normal logic-0 at throttle inhibit port 9 also appears at of U3-B pin 3. With logic-0 on pin 5, a logic-1 on pin 4 and a logic -0 on pin 3, U3-B will output at pin 6 a logic-0 which is connected to both U1-A pin 1 and U1B pin 6. With a quiescent input status U1-A and U1-B will both output a logic-1 to control input A, pin 10 and control input B, pin 9 of U4, an analog multiplexer/demultiplexer. U4 serves as a digitally controlled 2 pole 4 throw electronic switch. The position of the electronic switch is controlled by logic functions on pin 9 and 10 of U4. With a logic-1 on both A and B controls, switch Y pin 3 will connect to Y3 which is connected to a reference potential established by a series connected resistor chain comprised of resister R22, R18, R17 and R19. The voltage present at pin 4 is picked off between R18 and R17 which yields a potential somewhat less than ½Vs (+8.0 vdc) or approximately 3.25 vdc. This potential is switched through U4 to output pin 3 which is in turn attached to U12-B pin 5. AR4-B pin 5 is also attached to Vr (+3.25 vdc) which established a reference for the pulse width modulator. Output X pin 13 of U4, is connected to pin 6, the inverting input of AR4-B and is also tied to the positive terminal of capacitor C13 which with C1 and R63 form on R/C time constant around AR4-B. Output X, pin 13 of U4 is also connected through the electronic switch to X3 pin 11 which is in turn connected to the positive side of C1. Like capacitors C13, and C1 are tantlum capacitor tied negative to negative to form a single capacitive valve equal to C13×C1 divided by C13 +C1. The objective of electronic switch X to X3 is to short out C13, C1 combination during a non-command period to re-establish the reference point. U12-A pin 1 and U12-B pin 2 both output a logic-0 during non-command period. The remaining portion of throttle control module which includes the interlock circuit mode up of U8-A, C, and D, invertor U7-A, B, C, D, E, & F, current limit circuit AR2 and U9-A, darlington drivers U1, A, B, C, & D and the power darlingtons Q2, Q3, Q4, and Q5 are of the same design configuration discussed within the clutch control module. Therefore, a detailed logic progress will not be discussed herewithin. A brief discussion on general logic flow will demonstrate functional theory.

The logic-0 at U12-B pin 2 is connected to U8-D pin 13 and U7-F pin 13 where it is inverted to appear at U8-A pin 2. The logic-0 at U12-A pin 1 is connected to U8-C pin 9 and U7-E pin 11 where it is inverted to appear at U8-A pin 1. As established previously, no throttle command exists, therefore current limit was not enacted, thus U9-A pin 2 outputs a logic-1 which connects to U8-D pin 12. U8-D pin 11 outputs a logic-1 which is inverted by U7-B and connected to U11-B pin 6. The logic-0 on the input of U11-B causes the output, pin 8 to rise to vSW (+12 vdc) and bias Q2 collector to zero volts, which is connected to output port 7, the negative input to the throttle remote transfer module 11 FIG. 1. The throttle remote transfer module is connected to interconnect with cable 52 which terminates within the interconnecting matrix and control module to be bussed to the throttle control module.

The logic-0 on U12-A pin 1 is connected to U8-C pin 9 and inverted by U7-E which connects to U8-A input pin 1. The output of U8-C pin 10 becomes a logic-1 which is inverted by U7-A to appear through a 4.7k ohm resister R50 to U11-A pin 3 as a logic-0. A low on the input of U11-A causes the output to rise to Vsw (+12.0 vdc) to bias Q3 so that the collector is pulled near to ground potential.

With both pin 1 and 2 of U8-A at a logic-1 the output becomes a logic-0 which is delayed by R/C time constant of a 100k ohm resistor R51 and C8, inverted by U7-C to produce a logic-1 and bias at U11-D output pin 16 and U11-C output pin 9 to near ground. The ground potential on the collector of Q3 is transferred to output port 8, which is bussed through cable 52 to connect to the posivite potential terminal of the throttle servo motor. Both inputs to the motor are at ground potential, therefore the throttle arm which is attached to the transfer module will not be moved.

To command a throttle advance or increase the engine RPM, the port throttle switch SW7/SW8 in the portable hand controller described in FIG. 5 must be moved forward to allow the movable contact pin 2 to switch contact pin 1 which is connected to Vs (+8.0 vdc). This contact produces a logic-1 command which is connected through edge connector port throttle output port 13 shown in FIG. 5 and bussed within interconnecting cable 46, helm cable plug 47 and remote socket 43, through interconnecting cable 39 through the remote interconnecting matrix and controls module to input port of the throttle control module (FIG. 8).

The logic-1, advance throttle command, pulls the quiescent potential that existed at port 15 to a logic-1 or Vs (+8.0 vdc), where it is connected through 10k ohm resister R3 to the non-inverting input, AR1-A pin 3 and the inverting input of AR1-B pin 6 which are voltage comparators configured to act as threshold detectors. The input potential being greater than the reference potential of AR1-A pin 2 causes its output to change from a logic-0 to a logic-1. The output of AR1-B pin 7 shall remain at logic-0. The output of AR1-A pin 1 is connected to U1-A pin 2 where the logic-1 changes the output status of U1-A pin 3 to logic-0. This occurs because the manual inhibit remains at logic-1 and the throttle inhibit remains at logic-0. The output of U1-B pin 4 will remain at a logic-1. With the A control input of U4, pin 10 assuming a logic-0 the U4 electronic switches internally. Y output pin 3 contacts Y2 pin 2 and X output pin 13 contacts X2 pin 15. This change in electronic switch position removes the short around C13, and C1 and places a ground potential on output X pin 13. The rate by which pin 13 changes from Vr (+3.25 vdc) is determined by the R-C time constan of series capacitor C13, C1 and resistor R63. R63 is a 1M ohm variable resistor so the R-C time constant can be adjusted for user needs. The value of R63 is determined by how fast the user wishes the throttles to advance. The ground potential at U4 pin 13 is connected to the inverting input pin 6 of AR4-B, a dual low power operational amplifier. The inverted output, pin 7 of ARB-4, will start to increase at a pre-set rate determined by the R/C time constant and be coupled to Y2 pin 2 of U4. The internal electronic switch has joined Y2 pin 2 to Y pin 3 which in turn conducts to U12-B pin 5 and U12-B pin 6. The signal which is ac coupled to corresponding inputs of U12-A and B is a triangle wave, which is generated by U6-D and AR4-A. U6-D is configured as a squarewave oscillator generating a frequency of 1 khz. The squarewave is coupled through a 22k ohm resister R16 to AR4-A pin 2. AR4-A is configured as an intergrator to produce a symetrical triangular waveform of 1 khz.

The output of AR4-A pin 1 is capacitively coupled to U12-B pin 4 and U12-A pin 7 by capacitator C3 and C4. Inverting input, pin 4 of U12-B, is biased above Vr (3.25) by R22, R18, R17 and R19, while non-inverting input, U12-A pin 7 is biased below Vr(3.25). By applying a varying d.c. input to U12 pin 5 and a triangular waveform to pin 4, U12-B shall act as a pulse width modulator. The instant the d.c. potential on pin 5 starts to increase, U12-B becomes biased such that the output at pin 2 is switched on and off symetrically to produce 50% duty cycle squarewave. As the d.c. input continues to increase the duty cycle present at U12-B pin 2 changes from 50 percent to 100 percent increasing proportional to the d.c. input, therefore the averaged d.c. potential will increase from 0 vdc to +8.0 vdc as the positive portion of the squarewave becomes greater and the negative portion gradually becomes less. U12-A pin 1 will remain at a logic-0 because of the input bias. At this point we must assume that the fast limit or maximum allowed throttle movement has not been reached, therefore, threshold detector (limit detector) U12-D and C are not energized and both outputs, U12-D pin 13 and U12-C pin 14 are a logic-1. With no limit condition reached, the output of U12-B pin 2 is directly coupled to the input U8-D pin 13. U12-B pin 2 is also connected to U7-F pin 13 which is a hex schmitt trigger being used as an inverter, also to enhance noise immunity and square up input logic signals. The inverted input is directly coupled to U8-A pin 2. Since U12-A pin 1 remained a logic-0 its inverted input on U8-A pin 1 will remain a logic-1. The logic-0 on U8-A pin 2 causes U8-A pin 3 to change from a logic-0 to a logic-1. This change of status is delayed by the R-C time constant made up of C8 and R51. As the changing capacitor, C8 reaches the threshold level of the schmitt trigger U7-C the input will be inverted to appear as a logic-0 on U7-C pin 6. A millisecond prior to U7-C pin 6 going low, U8-D pin 11 will also go low to a logic-1. U7-B will invert and square this signal to output a logic-1 to the quad, darlington driver U11-B which will cause its output, pin 8 to be pulled low and in turn bias Q2, a PNP darlington power driver, such that the collector rises to +12.0 vdc. However, it must be remembered that the output of U12-B pin 2 was pulse-width modulated and was therefore outputting a squarewave of whose duty cycle is reflected through to the collector of Q2 where it is connected to output port 7. Output port 6 will remain at the ground potential due to logic-1 on U8-C pin 10.

The function of the current limit circuit was discussed in detail on the clutch control module. Referring again to the throttle control module schematic, FIG. 8 a brief discussion will reveal that R47 is a current sense resistor. As current flow through R47 increases, the voltage across the resistor will decrease to a pre-set threshold potential established by a voltage divider R56, R57, and R55. R56 being an adjustable resistor allows the threshold to be adjusted for each application. The objective of this adjustment is to assure no damage can be done by the servo motor by exerting too much pressure on the engine controls. As the pre-set threshold is reached for a given amount of current AR2-A will change output status from a logic-1 to a logic-0. This output will be inverted by U7-D to apply a logic-1 to the set input of U9-A pin 6 a dual type D flip-flop. The signal present on the data input terminal, pin 5 is a ground potential or logic-0. The reset input, U9 pin 4 was pulled low to a logic-0 when U7-C pin 6 went low. With the set input, U9 pin 6 going high to a logic-1, ($\overline{Q}$) assumes a logic-0 status. Pin 8, the ($\overline{Q}$) output of U9-A is directly connected to U8-D pin 12 and U8-C pin 8. By applying a logic-0 to pin 12 and 8, all throttle commands are locked out causing the collector of Q2 and Q3 to fall to a ground potential and holding the servo motor in its last position. By reversing the direction of command or by shutting the system off the current limit can be reset. This occurs by U7-C pin 6 assuming a non-command output of a logic-1 as explained previously. With no excessive current flow through R47, AR2-A pin 1 will output a logic-1 which is inverted by U7-D to place a logic-0 on the set input U9-A pin 6. This causes the ($\overline{Q}$) output, pin 2 to output a logic-1, thus removing the lock-out from interlock circuit U8-D pin 12.

Referencing back to the squarewave generation circuit, the normal R-C time constant set by R63 allows 1.0 second for the d.c. signal on AR4-B pin 7 to change from Vr (+3.25 vdc) to Vs (+8.0 vdc).

It is during this period of time that the squarewave duty cycle is changing at U12-B pin 2 proportionally to this changing d.c. It must also be noted that the instant the advance throttle command, a logic-1, is removed from command input port 15, the control inputs of U4-A pin 10 and B pin 9 will assume a logic-1 status causing X output to contact X3 and Y output to contac Y3. The instant the circuit of X to X3 is connected, the series capacitors of C13 and C1 is shorted, changing the potential across AR4-B back to Vr or +3.25 vdc. This step resets pin 7 AR4-B, thus allowing the end user to jog the throttle control for minute advancements or retards.

Output port 7 and shift inhibit 6, are interconnected through the interconnecting matrix 25 FIG. 1 to interconnect cable 52 which connects to connector 52A. Connector 52A is directly wired to the port throttle, remote transfer module servo motor 11 FIG. 1.

As long as the throttle advance command is given, input port 15 FIG. 8 will remain as a logic-1. As explained, this logic-1 creates a squarewave at the collector of Q2 where the duty cycle of this squarewave changes such that the positive portion of the squarewave gets wider thus causing the average d.c. to increase proportionally until after 1.0 seconds the collector of Q2 is at +12 vdc and the duty cycle is 100% in the posivite direction. Q2 collector being connected directly to the servo motor's negative terminal, the motor will turn in such a direction as to increase the engine's throttle setting by extending the plunger 125 FIG. 20 of the servo motor. The movement of the plunger is monitored by resistive element 180 FIG. 20 (R15 on FIG. 8) and brush assemble 181 FIG. 20. Position information in the form of an analog d.c. potential is sensed by brush assembly 181 FIG. 20 which communicates to throttle servo position input port 8 (FIG. 8). As the servo motor plunger moves out, the d.c. potential at input port 8 will increase. This increasing d.c. potential is connected to AR3-A pin 3, the non-inverting input where the output of AR3-A pin 1 is directly connected to input AR3-A pin 2 and output port 12 through a 2.2k ohm resister R60. Output port 12 feeds throttle position data to the automatic engine synchronizer module. The output of AR3 pin 1 FIG. 8 is also connected through a 22k ohm resistor R27 to the inverting input U12-D pin 10 and non-inverting input U12-C pin 9. U12-D and C are configured as adjustable limit detectors. A 100k ohm, fast limit variable resister R25 is adjusted to set the maximum RPM allowed or that point where the manual control stops advancing the engines R.P.M. A 100k ohm, idle limit variable resister R32 is set to the minimum RPM or that point where the manual controls stops retarding the engine's speed. For this dicussion R25 has been set so the voltage on U12-D pin 11 is 6.0 vdc and R32 has been set so the voltage on U12-C pin 8 is 2.0 vdc. Therefore, as the voltage on U12-D pin 10 increases beyond the threshold point, U12-D pin 13 will change status by pulling low to logic-0. This low will cause current to flow through a 470 ohm resister R28 lighting DS2 to indicate that a fast limit has been reached. The logic-0 on pin 13 will also pull U12-B pin 2 low through blocking diode CR2. The logic-0 on U12-B pin 2 is connected directly to U8-D pin 13 which again locks out the throttle advance command by causing the output U8-D pin 10 to go high to a logic-1. This in turn biases Q2 so the collector falls to a ground potential and stops the throttle servo.

To decrease the engine RPM the movable contact 2 must touch contact 3 of the port throttle switch on the portable hand controller SW7/SW8 (FIG. 5), thus placing a ground potential or logic-0 on the port throttle output at edge connector port 13. As explained previously, output port 13 is inter-cabled and connected to input port 15 of the throttle control module FIG. 8 the throttle command for the throttle controle module.

With a logic-0 or retard command given, the input pins 3 and 6 of AR1 are pulled low to a logic-0. AR1-B pin 5, being biased above the logic command causes the output AR1 pin 7 to rise to a logic-1. AR1 Pin 7 is directly connected to U1-B pin 5 and U3-B pin 2. Since the manual inhibit has remained a logic-1 and the throttle inhibit has remained a logic-0, U3-B pin 3 will remain at a logic-0. Therefore, pin 6 of U3-B will remain at a logic-0 which is reflected to input pins 1 and 6 of U1-A and B. With a logic-1 on pin 5 and a logic-0 on pin 6, U1-B pin 4 will output a logic-0 to control input B pin 9 of U4. A logic-0 on control B and a logic-1 on control A of U4 causes electronic switches Y pin 3 to contact Y1 pin 5 and X pin 13 to contact X1 pin 14. Pin 14 is directly connected to Vs (+8.0 vdc). The high or logic-1 at pin 14 of U4 is electronically switched through U4 to pin 13 the output, where it is imposed on pin 6 of AR4-B, pin 6. The inverted output, pin 7 of AR4-B will start to decrease its output voltage at a rate established by the R-C time constant of R63, and the series combination of C1 and C13. The output of AR4-B is connected to Y1 pin 5, electronically switched through U4 to output Y pin 3 which is in turn connected directly to input pin 5 and 6 of U12-B and A respectively. As explained previously, a triangular waveform generated by U6-D and AR4-A is capacitive coupled by C3 to the inverting input of comparator U12-B and by C4 to the non-inverting input of comparator U12-A. A d.c. reference voltage that is less than Vr (+3.25 vdc) is placed on pin 7 of U12-A by the resistive divider chain of resisters R19, R17, R18, and R22. Being a.c. coupled the trianglular waveform will be inposed on this voltage. Therefore, as the retard command and on pin 6 starts to decrease below the Vr level of +3.25 vdc, the reference voltage, which is the triangular waveform, will cause the output at U12-A pin 1 to swing high to Vs(8.0 vdc) during that period of time when the positive peak of the waveform is above command input voltage. The output at U12-A pin 1 will appear as 50% duty cycle squarewave. As the retard command voltage continues to decrease below the biased voltage established by the resistive divider, the output duty cycle will continue to change causing the positive portion of the squarewave to increase and the negative duty cycle to decrease. As long as the command to retard exists for greater than ½ second the duty cycle will continue to change. After approximately ½ second pin 1 will be at Vs or a logic-1. During the positive portion of the squarewave a logic-1 will appear on U8-C pin 9. A non-current limit status will also produce a logic-1 on U8-C pin 8. Two highs on the input pins of U8-C will result in a logic-0 on output pin 10.

At the same instant unlike inputs on U8-A will cause its output, pin 3, to go high to a logic-1. This change in logic function is delayed by the R-C time constant of R51 and C8 until it reaches the threshold level of schmitt trigger inverter U7-C which will output a logic-0. The logic-0 on U7-A pin 1 is inverted and imposed on the input of U11-A where the output swings low, biasing Q3 such that the collector swings up to Vsw (+12.0 vdc). Once must remember that the signal from the interlock U8-C was a square wave of whose duty cycle was changing. After ½ second the collector of Q3 would be at Vsw and not switched on and off at 1 khz.

The positive drive voltage present at the collector of Q3 is directly connected to output port 6. As explained previously, this port is connected to the positive terminal of the throttle servo motor. The positive voltage on the positive terminal causes the servo motor to rotate in such a direction as to cause the port throttle, remote transfer module to decrease the port engine's throttle. The retard command causes the servo motor to draw the plunger 125 into its housing 143 causing the brush assembly 181 to wipe the resistive element 180 and produce a d.c. voltage that is decreasing proportional to the travel of the plunger. The output of the resistive divider is schematically shown by R15 FIG. 8. As the wiper continues to move toward ground its voltage output is connected to input port 8 where it is buffered by AR3-A and connected to the non-inverting input of idle limit detector U12-C pin 9. A reference potential of 2.0 vdc has been assumed for this discussion. At the instant the wiper of R15 drops below the reference potential set by resister R32 the output, U12-C pin 14 will drop to a logic-0 causing current to flow through resister R29 and lite DS1 which indicates on the module that the idle limit has been reached. The logic-0 is reflected through blocking diode CR3 to pull the interlock U8-C pin 9 low to a logic-0, locking-out the retard command and stopping the servo motor. At the same time U12-C pin 14 went low, its output is coupled through blocking diode CR1 to the inverting input, U6-A pin 6.

The instantaneous change from a logic-1 to a logic-0 is delayed by an R-C time constant which is made up of C6 and R40. To establish a variable delay, a variable resistor, R38, is placed into the voltage divider chain made up of resisters R32, R38, and R39. By varying R38, the threshold level of U6-A can be varied and in turn change the time when the output of U6-A pin 1 will go high to a logic-1. This time period can be varied from 1 second to 8 seconds. As U12-C pin 14 transfers to a logic-0, this low voltage is coupled through CR1 and decays at the rate equal to the R-C time constant. Assume R38 is set for a 2 second delay. As the voltage on pin 6 decays from the original logic-1 (+8.0 vdc) down to the logic-0 (ground) at that point where the voltage at pin 6 is less than the voltage on pin 7, the output, pin 1, of U6-A will change status from a logic-0 to a logic-1. This logic-1 is reflected on the base of Q1, causing the transistor to conduct and the collector to fall to a near ground potential. This low voltage is coupled to ouput port 10, the idle light output. Output port 10 is connected through the interconnecting matrix and control module to the hand-held controller at input port 12 where it is connected to DS4 the port idle status indicator. The logic-1 of U6-A is also connected to U3-C pin 13 where it changes the output of U3-C to a logic-0. U3-C output, pin 10 is connected to output port 4, the shift inhibit. A logic-0 at port 4 allows the transmission to be shifted.

Figure 11:
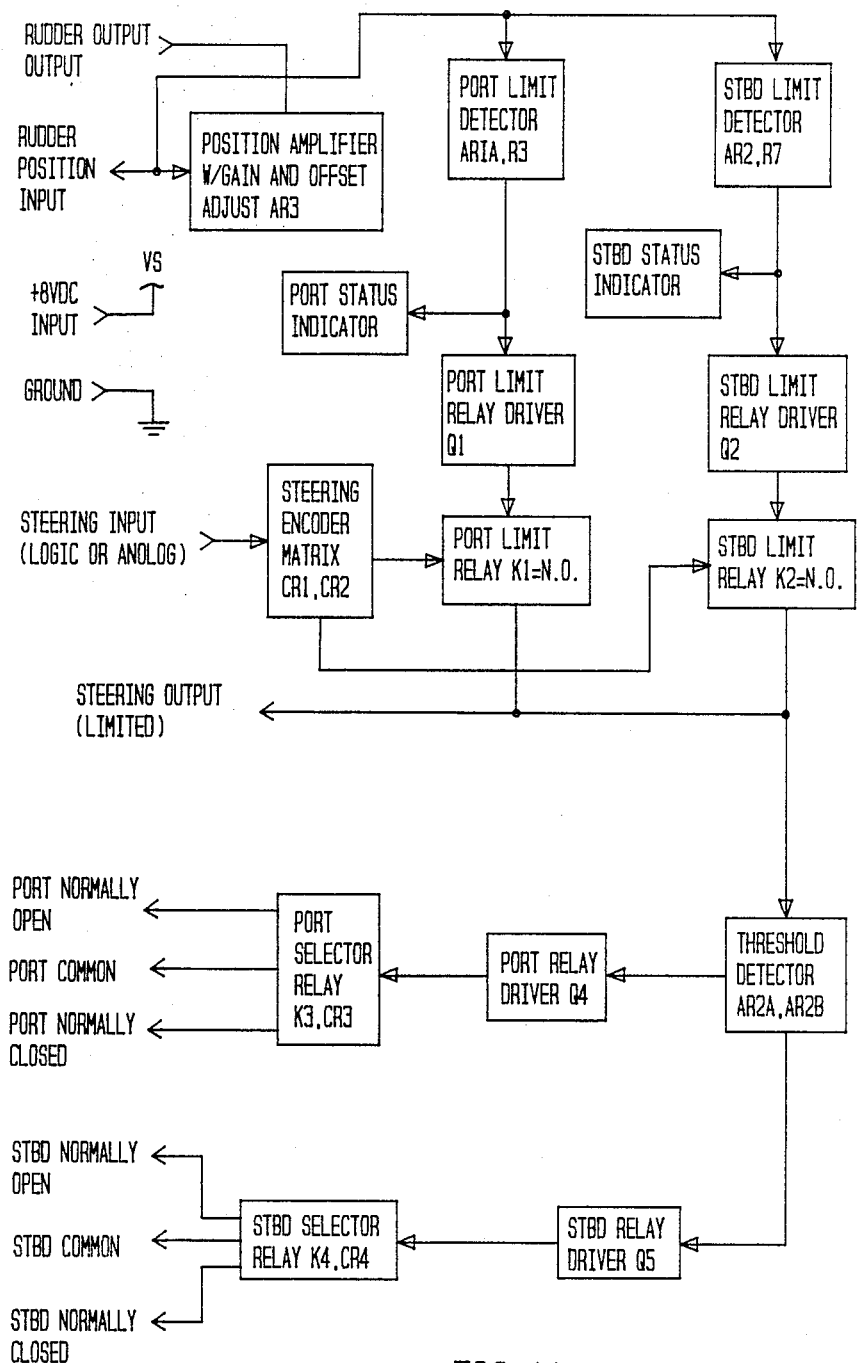
FIG. 11: is a block diagram of the auto pilot interface and servo drive module.
Figure 12:
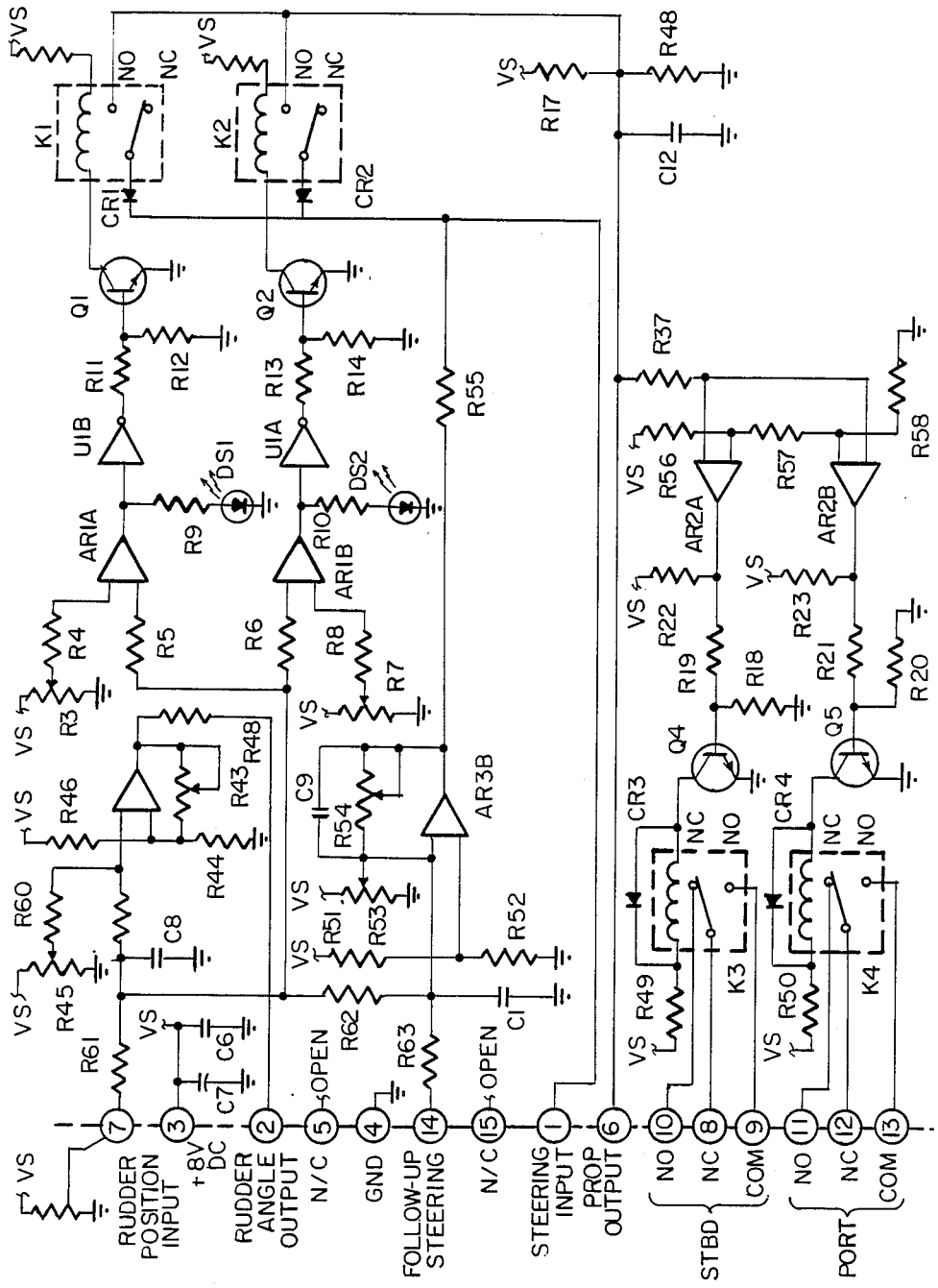
FIG. 12: is a schematic diagram of the autopilot interface and servo drive module.

The autopilot interface and steering module 33 FIG. 1 is shown as a block diagram in FIG. 11 and as a schematic diagram in FIG. 12. As represented in FIG. 1 the autopilot interface and steering module is a plug-in daughter module which can be added to the system at any time or removed and replaced in case of failure. This autopilot interface and steering module is a multi-function module which allows the system to directly interface the steering function with existing autopilots on the market. This interface can be in the form of an isolated switch which provides port and starboard dodge functions or can be in the form of a proportional drive signal. The interface module also serves a rudder angle detection and limit detector.

Figure 23:
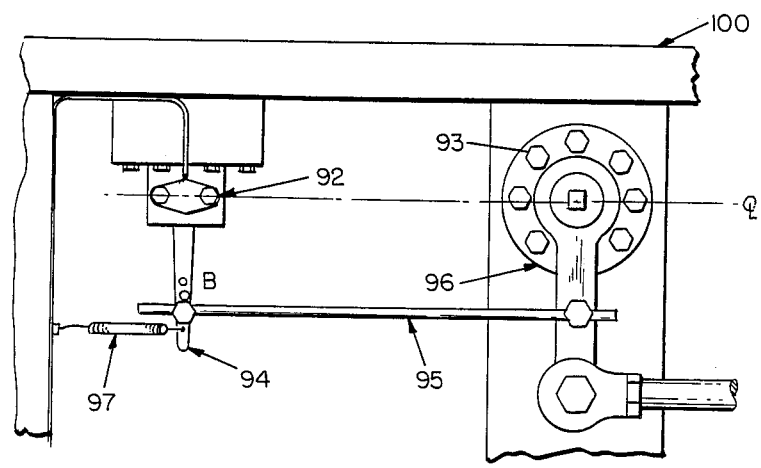
FIG. 23: is an illustrative view of rudder position transducer installation.
Figure 19:
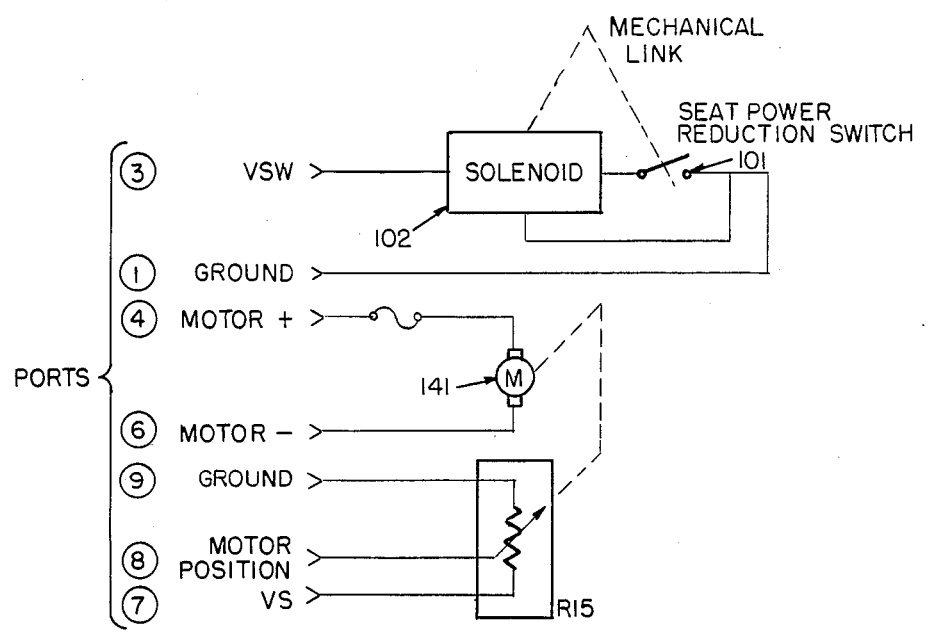
FIG. 19: is an illustrative schematic of remote transfer module.

In FIG. 1, the rudder position transducer 18 is shown in a block form. In FIG. 23 the rudder position transducer 92 is shown in an installation while in FIG. 12, it is shown in schematic form as a rheostat, or variable resister R55. The rudder position transducer while being of standard design configuration and issued in several different configurations by autopilot manufacturers it is shown in FIG. 23 in its normal installed configuration. The rudder position transducer 92 is mounted by its housing on or near the transom 100 of the vessel. It is normally mounted near the rudder arm 96 and rudder shaft 93 so that it can be mechanically connected by a rod or stainless steel cable 95. In most cases a return spring 97 is used to keep a true angle between the feedback arm 94 and rudder arm 96.

With the rudder of the vessel, or the outboards, in an amidship position, that position which steers the vessel in a straight line, rheostat R55 FIG. 12 the rudder position transducer, should be mechanically positioned so the voltage present at the autopilot interface and steering module input port 7 FIG. 12 is one-half Vs or +4.0 vdc. R55 acts as a variable voltage divider and outputs d.c. voltage proportional to the rudder angle. The 4.0 vdc present at input 7 is filtered through resister R61, C8 and appears on the non-inverting input, AR3-A pin 3. Variable resistor R45 which is configured as a voltage divider, acts as an offset or zero adjustment for possible rigging or installation offsets of R55, wiper 1. By referencing AR3-B pin 5, which has a precision reference voltage which is generated by R51 and 52, the installer is able to adjust R45 until a null offset is seen at AR3-A pin 1. Variable resistor R43 serves as a gain adjustment for the rudder angle, while resister R46 and R44 are configured as a voltage divider with equal values to output a voltage reference potential which is one-half Vs (+8.0 vdc). AR3 pin 1 is connected through protection resistor R48 to rudder angle output port 2. The output of port 2 is connected within the interconnecting matrix 25 FIG. 1 to barrier strip TB1 which allows this signal to be connected to rudder angle indicators that are on the market. The signal present at rudder angle output port 2 is also interconnected through the interconnecting matrix and control to input port 8 of the portable hand-held controller. As explained in the portable hand-held controller discussion, when the input voltage at port 8 is one-half Vs or approximately 4.0 vdc IC3 pin 10, (FIG. 5) will be low, thus causing current to flow and lighting amber colored LED-7 to indicate rudder amidship. With the vessel steering a straight course R45 on the autopilot interface and steering module (FIG. 12) is adjusted for a lit LED-7 on the hand held controller (FIG. 5).

The rudder position input voltage pre-set at the input of the autopilot inferface and stearing module port 7 is also connected to the port direction, AR1-A and starboard direction AR1-B limit detectors. Port direction limit detector AR1-A receives its rudder position data on pin 3 of non-inverting input, while the starboard limit detector, AR1-B receives the rudder position data on pin 6, the inverting input. Variable resistor R3 serves as a variable limit adjustment, or reference voltage for AR1-A, and R7 serves as the variable limit adjustment, or reference for AR1-B. In this discussion we shall assume R3 has been set to provide a limit reference voltage of 6.0 vdc at AR1-A pin 2. R7 is set to provide a limit reference of +2.0 vdc at AR1-B pin 5. With the rudder position input at +4.0 vdc both AR1-A and AR1-B will output a logic-0 or near ground potential. The output of AR1-A and AR1-B is inverted by U1-A to produce a logic-1 on the base of Q1 and Q2. The logic-1 or high on the base of each transistor forces the transistor into conduction thus the collectors will drop to a near ground potential. This low on the collector causes current to flow from Vs through R15 and R16, through coils of K1 and K2, Q1 and Q2 to energize relays K1 and K2, causing the movable relay contact 7 & 8 to touch contact 14 the normally open (N.O.) contact. Relays K1 and K2 will remain energized as long as power is applied and a no-limit condition exists. With a conduction path through K1 and K2, the steering or dodge signals have a non-limited path to the directional comparator AR2-A and B. SW6 of the portable hand controller which produces a steering command is a single pole, double throw, center off momentary on switch. In the non-steer mode, the potential at the ouput steering edge connector port 1, FIG. 5 is a quiescent potential which is established by resisters R17 and R19 on the autopilot and steering module FIG. 12. The quiescent voltage, or one-half Vs (+8.0 vdc) falls within the window established by the voltage divider of R56, R57 and R58. With no steering command give Q4 and Q5 are biased such that their collectors are at Vs, therefore, relays K3 and K4 are not energized.

K3 and K4 are micro-miniature 30 amp power relays and are used to provide an isolated output for steering or interfacing with existing controls. When K3 and K4 are wired to interface with existing autopilots, outputs port 8 and 12 are connected to the autopilots ground. Output port 10 and 11 are tied to an internal voltage source, while the common output ports 9 and 13 are isolated outputs which serve as remote dodge signals for the autopilots. When interfacing with engine driven hydraulic or pneumatic steering controls K3 and K4 are configured to actuate solenoid values. In this configuration output port 8 and 12 the normally closed (N.C.) contacts are tied to the vessel's negative or ground potential. The normally open (N.O.) contacts 10 and 11 are tied to the positive side of the battery. The common output ports 9 and 13 are tied to one side of the solenoid coils while the opposite side is connected to ground. On this configuration when either K3 or K4 are energized, one or the other solenoid is energized by the switched battery voltage. This same configuration can be used with a permanent magnetic d.c. motor where the positive input of the motor is tied through the interconnecting matrix to output port 9 and the negative side of the motor to output port 3.

With a port steering command give the movable contact 2, of SW6 FIG. 5 will touch contact 1 causing ouput port 1 FIG. 5 to output a logic-0. As explained previously the output and input ports of the hand-held controls are cabled to the interconnecting matrix where they are interconnected to the autopilot interface and steering module input port 1, FIG. 12 where it is blocked by diode CR2 but passed by CR1 to K1 contacts 7 & 8, through K1 to contact 14 and eventually to inputs AR2-A pin 3 and AR2-B pin 6. Being a logic-0 the command potential is less than the reference voltage set by the quiescent window therefore AR2-B will change state; causing output pin 7 to go high, which biases Q5 into conduction causing its collector voltage to drop, current to flow through K4, thus energizing K4 and connecting the common of K4 to the normally open of K4. With the closure of K4 a motor or solenoid has been energized to move the rudder. The rudder will continue to move as long as the port steer command is held. As soon as the port steer command is withdrawn, the input returns it its quiescent voltage, the input command falls within the window detector, K4 returns to an unenergized state, and the motor as solenoid stops to hold the rudder in that that position. As long as the port steer command is given, K4 will remain energized and put-in rudder As the rudder is being moved, its position or angle of rotation is being monitored by rheostat R55 the rudder position transducer. As the port steer command is given, and the rudder starts moving in the port direction, the output of R55, which is connected to the rudder position input port 7 will begin to rise toward Vs (+8.0 vdc). The continued movement of the rudder will cause the rudder position input port 7 to continue to rise toward Vs. This increase in voltage is amplified by AR3-A and output to rudder angle output port 2 where it is interconnected to edge connector input port 8, of the portable hand-held controller (FIG. 5). As the rudder position input voltage on the hand controller begins to rise AR6 (FIG. 5) a voltage comparator will output a logic-0 and light LED-6. An additional 250 mv increase will cause AR5 to output a logic-0 and light LED-5. Additional LED's will become lit, every five degrees or 250 mv or rudder change. When the voltage input at rudder position input port 7 reaches a voltage greater than the pre-set voltage set on AR1-A pin 2 on the autopilot interface and steering module (FIG. 12) which in this discussion is assumed to be +6.0 vdc, AR1-A pin 1 will output a logic-1. This logic-1 will light DS1 indicating on the autopilot interface and steering module that a port limit has been reached. The logic-1 is inverted by U1-B a schmitt trigger, producing a logic-0 which causes the collector of Q1 to go high, de-energizing K1 and opening the circuit between movable contact 7 & 8 to 14. The logic-0, port steer command present at input port 1 is inhibited by K1 causing the inverting input of AR2-B pin 6 to rise back to the quiescent voltage established by resisters R17 and R18.

Since the port command has reached its limit and has been disconnected by K1, no additional port rudder is possible. By releasing SW6 on the hand controller the port command will stop, however, the rudder will be held in its existing position. To return the rudder to amidship, the steering switch SW6 on the hand controller must be pressed in the starboard direction to connect switch contact 2, touch to contact 3 which will apply a logic-1 to output port 1. This logic-1 is conducted to steering input, port 1 on the autopilot interface and steering modules where CR1 will block a logic-1 signal but CR2 will pass the logic-1 through relay K2 contacts 7 & 8 to contact 14 where it is connected to the non-inverting input, AR2-A pin 3. The logic-1 is greater in value than the voltage set by voltage divider R56, R57, R58 on the reference, input pin 2. This causes AR2-A pin 1 to rise to a logic-1 and bias Q4 into conduction. With Q4 conduction, the collector potential falls to a near ground potential causing current to flow, energizing K3, connecting the common contact to the N.O. (normally open) contact, which causes the rudder drive apparatus to rotate the rudder in the opposite direction. This rotation is again sensed by rudder position transducer R55 of whose output voltage will start decreasing. This decrease in voltage will reflect through AR3-A at a rate of 250 mv per 5 degrees of rotation. The output of AR3-A is connected to rudder position output edge connector port 8 FIG. 5 where it is connected to all the voltage comparator inputs AR1 through AR12 on the portable hand controller. As the rudder position voltage decreases, LED-5 will extinguish, an additional 250 mv will extinguish LED-7 the amidship indicator and light LED-8 the five degree to starboard indicator. LED's 9 through 13 will continue to light and stay lit as the rudder position input voltage continues to decrease. As the point where the input voltage falls below the pre-set limit voltage established on AR1-B pin 5, the output at pin 7 will invert the input and rise to a logic-1 voltage of +8.0 vdc. This high will cause DS2 to become lit, indicating that a starboard limit has been reached. The logic-1 or high will be inverted by U1-A to bias Q2 off, causing the collector to rise to Vs and de-energizing the coils of K2. With K2 de-energized, the conductive path between relay contact 7 and 8 to 14 opens, therefore, the logic-1 steer command is disconnected from AR2-A pin 3 and returns to the quiescent voltage established by R17, R48. With the input voltage within the window AR2-A outputs a logic-0 which turns off Q4, de-energizes K5 and stops the rudder drive apparatus.

Figure 13:
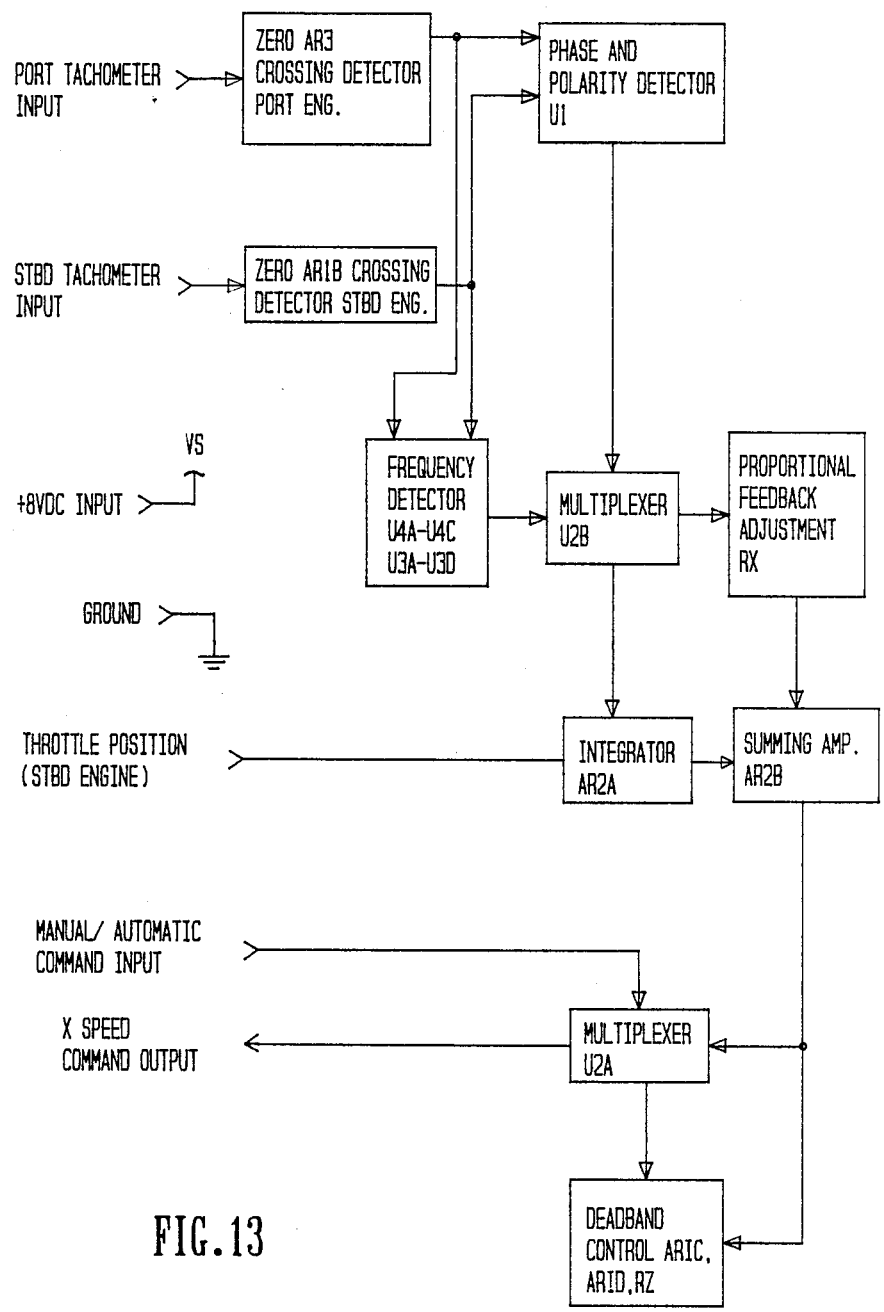
FIG. 13: is a block diagram of the automatic engine synchronizer module.
Figure 14:
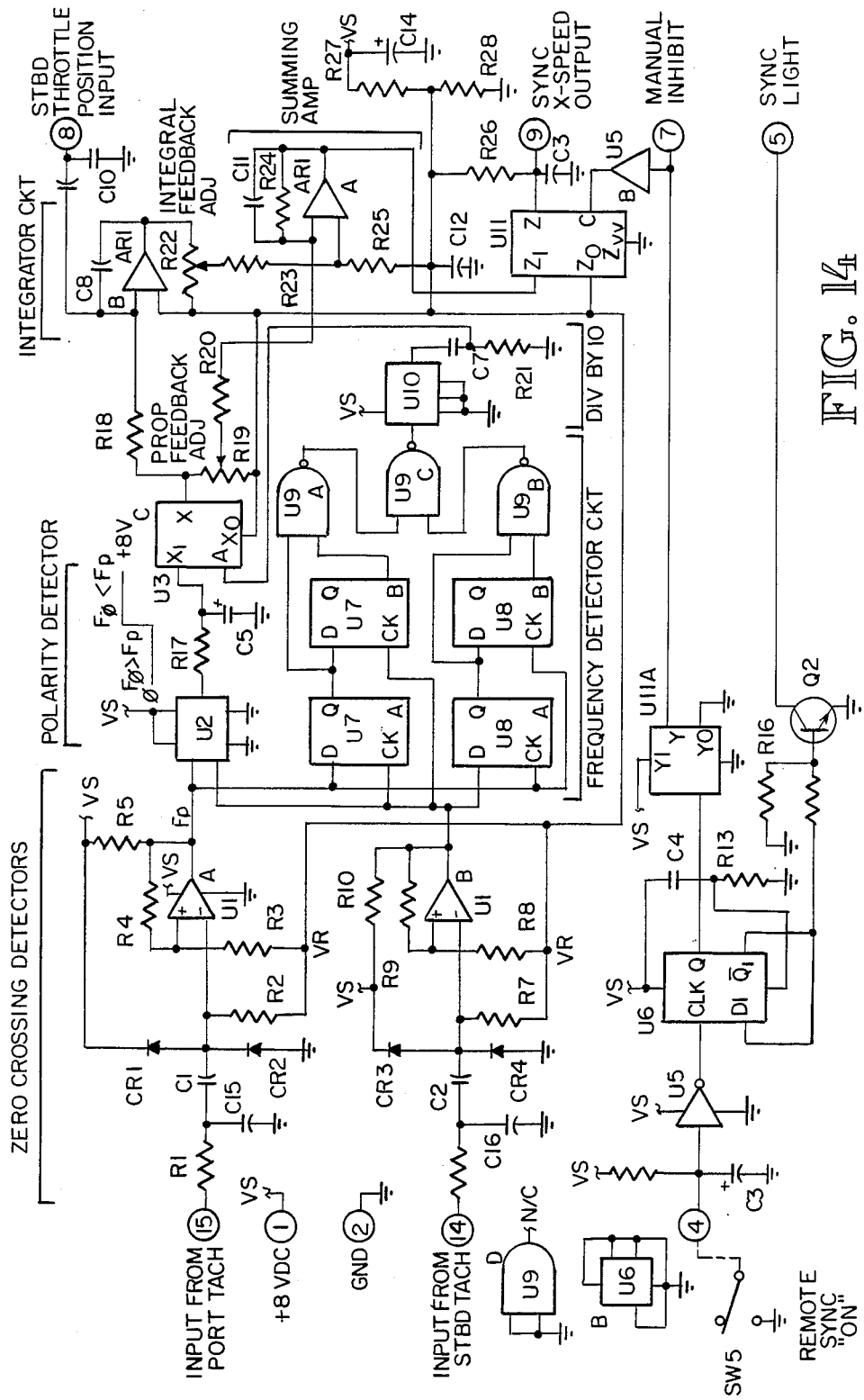
FIG. 14: is a schematic diagram of the automatic engine synchronizer module.

The automatic engine synchronizer module 32 FIG. 1 is shown as a block diagram in FIG. 13 and as a schematic diagram in FIG. 14. As described in FIG. 1, the automatic engine synchronizer module 32 is a plug-in module, therefore, becomes one of the daughter boards that is contained within the remote interconnecting matrix and control module 25.

The design configuration of the automatic engine synchronizer is unique in its approach to attaining engine synchronization.

The automatic engine synchronizer module FIG. 14 has seven input ports and three output ports. Module input port 1 brings the source voltage, Vs (+8.0 vdc) into the module. As discussed previously, this voltage is bussed throughout the system to provide a common operating voltage for all circuits. Input port 2 is system or battery ground. The remaining input and output ports will be discussed within the text.

The automatic engine synchronizer module, obtains engine speed—RPM information from existing tach. generators which are normally installed on marine engines. If the vessel does not already have these generators, speed responders or pulse generating devices can be attached to the vessel's output drive shafts to provide RPM data. The input RPM data to the automatic engine synchronizer module can be in the form of sinewaves, squarewaves or pulse data, however, both engines must have the same form of data to permit synchronization. The discussion herewithin shall be based on RPM data that is generated by tach generators which are installed on the vessel. This data shall be picked-off by two twisted pairs, cable 67 FIG. 1 and terminated within the interconnecting matrix and control module 25, FIG. 1, TB2 where it will be interconnected with the input ports of the automatic engine synchronizer module 32.

Referencing the synchronizer schematic FIG. 14, input port 11 receives input RPM signals from the port engine while input port 12 receives RPM signals from the starboard engines. This information is always available to the engine synchronizer whenever the engines are running. For discussion purpose, within the text of this invention, a sinewave input signal shall be discussed. The port engine has been defined, by interconnections within the interconnecting matrix and control module 25 FIG. 1, as the master or reference engine. Therefore, the starboard engine is defined as the controlled or slave engine. Although, either engine may be designated as master or slave engine by reversing these connections.

R.P.M. signals from the port engine, received by the automatic engine synchronizer input port 11 FIG. 14, are capacitive coupled to prevent any dc component from entering the input circuits. Input diodes CR1 and CR2 clip and clamp large amptitude signals to assure they fall within the input characteristics of the input circuits. U1-A and U1-B are configured as zero crossing detectors of whose output will be a squarewave of the input frequency. Resistor R27 and R28 are precision resistors of the same value and form of a voltage divider to generate a reference voltage which will be one-half of Vs (+8.0 vdc). This reference voltage will be defined as Vr and shall have a voltage of +4.0 vdc. Resistor R2 which connects to the inverting input of U1-A pin 6 is connected to Vr (+4.0 vdc) and established the reference level for the voltage comparator U1-A. As the input sinewaves starts into the positive going cycle, output at U1-A pin 1 will go low and remain low until the sinewave is in the negative going cycle, 180 degrees later, at which time U1-A pin 1 will go high and remain high 180 degrees later when again it will switch low. This switching action about the zero crossing produces a squarewave equal to the input frequency. U1-B and its associated components are the same of U1-A as described above and, therefore, function in alike manner.

The squarewave output from U1-A pin 1 will be defined as fp or the port frequency while the squarewave output from U1-B pin 2 will be defined as fs or starboard frequency. Both the port and the starboard squarewaves are interconnected to U2, a CMOS phase-locked loop. The port signal, fp is connected to input U2 pin 3 and the starboard signal, fs is connected to input U2 pin 14. U4, an MC1464B phase-locked loop is used only to determine the polarity of the frequency difference. Internally within U2 is a phase comparator with leading edge sensing logic which provides a digital error output signal while maintaining a zero degree phase shift between input and output. The output of U2 pin 13 will be a logic-1 (+8.0 vdc) when the fp is greater than fs and will output a logic-0 when fp is less than fs.

The squarewave output of U1-A and U1-B are also connected to a frequency detector circuit which is made up of U7, U8, and U9. U7 and U8 are CMOS dual type "D" flip-flops while U9 is a CMOS quad 2-input "NAND" gate. The port signal fp from U1-A pin 1 is connected to the data input of U7-A pin 5 and the clock input of U8-B pin 11. The starboard signal fs from U1-B pin 2 is connected to the data input of U8-A pin 5 and to the clock input, of U7-A pin 3 as well as the clock input of U7-B pin 11. The four "D" flip-flop, U7-A, U7-B, U8-A and U8-B are used to generate the frequency difference between the port and starboard engines. By connecting the port signal, fp to the data input of U7-A pin 2 and clocking U7-A and B with the starboard signal fs and in turn connecting the starboard signal fs to the data input of U8-A pin 5 and clocking U8-A and U8-B with the port signal fp, plus "NAND" gating the Q and (Q̄), pulse will be generated, at "NAND" gate U9-C pin 10, with a rate equal to twice the difference frequency with a width to the period of the input frequencies. The output of U9-C pin 10 is connected to U10 pin 14 the input to CMOS decade counter/divider which is configured as a divide by 10. By way of example, it can be seen that should the port tach be sending a 200 hz signal and the starboard tach. be sending a 180 hz signal, the frequency difference would be 20 hz. The output, pin 10, of U9-C will be 40 hz, which is also the input frequency of the divide by ten circuit U10. The output of U10 at the differentiator C7, R21 will be 2 positive spikes per second. These positive pulses are connected to the "A" control input U3-C pin 11.

U3-C is a CMOS analog multiplexer/demultiplexer which functions as a digitally controlled analog switch. When pin 11, the A control input is low, (logic-0) the internal electronic switch connects the output pin 14 to X0 pin 12, which is connected to Vr (+4.0 vdc). The positive pulse from U10 pin 1 and the differentiator causes U3-C pin 11 to go high (logic-1) which changes the electronics switch internal to U3 and connects X pin 14 to X, pin 13. As explained before, this is the input from the polarity detector. The example defines the output from the port tach to be higher than the starboard tach. This being the case, U2 will output a logic-1 (+8.0 vdc) to X1 pin 13 where it is switched through U3 to pin 14. The duration or width of the pulse at pin 14, U3-C is equal to the width of the pulse control A, input pin 11. Each pulse that is generated by switching between X0 (+4.0 vdc) and X1, transfers that polarity pulse which is riding on Vr to the input of the intergrator AR1-B pin 6. The same pulse is fed through R19, which serves as proportional pick-off to the inverting input, AR1-A pin 2. resister R23 serves as an integral feedback adjustment and allows the pick-off of that amptitude of integral signal to facilitate throttle movement. The wiper of R2 is connected to the non-inverting input of AR1-A pin 3. The sum of the integral of the error signal and a portion of the error are summed together to an error signal from AR1-A pin 1 which is in turn connected to Z1, input of U11-B pin 3.

To turn the synchronizer on is accomplished by momentarily pressing SW5 on the hand held controller, which is a single poll, double throw momentary on switch, (FIG. 5). By momentarily pressing SW5, contact 2 will conduct through contact 1 to ground. This ground potential is connected to sync. on edge connector output port 11 which, as explained previously, is connected through the interconnecting matrix control module where it conducts into input port 4, on the automatic engine synchronizer module (FIG. 14). SW5 from the hand held controller is also shown schematically in FIG. 14 and as contact 2 touches contact 1, the high (+8.0 vdc) that is present at input port 4, due to pull up register R12, will momentarily be pulled to ground or zero volts. This transferral from a logic-1 to a logic-0 is sensor inverted by U5-A as a positive going pulse of U6-A pin 3. When d.c. power is first turned on, C4 and R13 serves to generate a set pulse to assure that output U6-A pin 1 always comes up a logic-1. Therefore the inverted pulse, a logic-1, will serve as a positive going clock pulse of U6-A pin 3 to transfer the logic-0 on the data input line, pin 5 to Q output pin 1. The logic-0 at output U6-A pin 1 is connected to U11-A pin 10, the B control input. The logic-0 serves to change the electronic switch position such that Q11-A pin 15 will output a logic-0 instead of a logic-1. This is accomplished by internal electronic switch connecting Q11-A Y pin 15 to Q11-A Y0 pin 2 ground. The output logic-0 is inverted by U5-B, a CMOS schmitt trigger, to input to U11 pin 9, the C control a logic-1. A logic-1 on the control input causes electronic switch to connect Z U11 pin 4 to U11 Z1 pin 3. The summed error signal is now coupled to sync. speed output at port 9. Output port 9 is interconnected to Y0 pin 1 and Y3 pin 4 the multiplexer/demultiplexer.

As explained previously with reference to the example, the starboard RPM was less, therefore, the polarity or directional control was a positive signal. The resultant output signals at sync. speed output port 9 is a series of positive going pulses about a reference voltage set by Vr. The rate of these pulses is determined by the difference in engine RPM. As the engines near synchronization, the number of pulses per second is very small. When the engines are synchronized, no pulses are generated, therefore, no throttle movement. By referencing the throttle control module discussion, it can be seen that positive pulses will result in the starboard engine increasing RPM while negative going pulses will result in a decrease in starboard engine RPM.

I claim:

1. A manuevering control system for a marine vessel having at least one conventional helm station for controlling the operation of a vessel, a source of electrical power, at least one engine having a throttle control and a forward-neutral-reverse state shift apparatus, the manuevering control system comprising:
   a disengageable electronic actuation means for said throttle control to create a signal to increase and decrease throttle;
   a disengagable electronic actuation means for said forward-neutral-reverse shift apparatus to shift the shift apparatus into a forward, neutral and reverse status;
   a shift responder means for said forward-neutral reverse shift apparatus to create and transmit a first electrical signal corresponding to a forward status, a second signal corresponding to a neutral status and a third signal corresponding to a reverse status;
   user activated electronic switching and controlling mechanisms and indicator means for controlling each of said disengagable electronic actuation means and to indicate status of shift position;
   control means associated with each of each disengagable electronic actuation means to engage or disengage said actuation means from their respective vessel control mechanisms whereby, when engaged, said electronic actuation means control the vessel with said conventional helm station disabled and, when disengaged, said conventional helm station controls the vessel in conventional fashion.

2. The manuevering control system of claim 1 wherein said control means comprises an electronic control module wired (a) to receive electrical power on-off signals, throttle increase and decrease signals, shift apparatus actuation signals, engine speed signal, first, second and third shift status signals from said shift apparatus, and (b) to generate signals for shift status indication and power on-off indication, engine throttle actuation and shift apparatus actuation in response to said received signals.

3. The manuevering control system of claim 2 including an engine responder means to create and transmit an electrical speed signal for said engine comprising an engine idle indicator means for said engine and a preset idle reference;
   and wherein said electronic control module transmits a shift status change signal to said shift apparatus only when said engine is indicated to be at idle.

4. The manuevering control system of claim 3 wherein said electronic control module includes a shift inhibit circuit to inhibit the change of status in the shift apparatus whenever said engine speed is not at idle.

5. The manuevering control system of claim 2 wherein a marine vessel has two engines, each having a throttle control, said system including an engine responder means for each engine to create and transmit an electrical speed signal for each engine; user activated electronic engine speed synchronization means for controlling the speed of one of said engines to equalize its speed with the other engine speed; and wherein said electronic control module receives speed signals from each engine and effects a correction in the speed of said one engine to equalize its speed with the other engine.

6. The manuevering and control system of claim 1 herein a marine vessel has a steering apparatus with rudder; and including a rudder angle responder means to create and transmit an electrical rudder angle signal; an engine speed responder means to create and transmit an electrical engine speed signal for said engine; a portable control panel incorporating said user activated electronic switching and indicator means, said switching and indicator means also indicating rudder status and engine speed.

7. The manuvering and control system of claim 6 wherein said engine is a master engine, said system further comprising:
a slave engine, an engine synchronization indicating means; an engine synchronization user activated control means; master and slave engine speed inidicators; and an electronic synchronization circuit module which receives master engine and slave engine speed information, compares said information to determine the difference in engine speed, creates a synchronization input signal, and applies said synchronization input signal to a slave engine throttle servo motor to equalize the speeds of said engines.

8. The manuvering control system of claim 7 further comprising:
an engine idle indicator means for each engine;
a preset engine idle electronic reference, said reference preadjusted to an equivalent engine idle level;
an engine idle electronics module means wired into said electronic control matrix to receive engine speed information signals, compare said engine speed information with the preset engine idle electronics reference, generating an idle speed signal and communicating said signal to the engine idle indicating means whenever the engine speed information is equal to the preset engine idle electronic reference.

9. The manuevering control system of claim 8 wherein the electronics module means also comprises a shift inhibit circuit to inhibit the change of status in the shift apparatus whenever said engine speed information is not equal to the preset idle electronics referencs.

10. The control system of claim 6 further including a rudder angel indicator means.

11. The manuevering control system of claim 1 including throttle actuating means linked to said throttle control for operating said throttle control when said throttle control disengagable electronic actuation means is engaged, said throttle actuating means being so constructed and arranged that it releases operative control of said throttle control in a power off condition.

12. The manuevering control system of claim 1 including shift apparatus actuating means linked to said shift apparatus for operating said shift apparatus when said shift apparatus disengagable electronic actuation means is engaged, said shift apparatus actuating means being so constructed and arranged that it releases operative control of said shift apparatus in a power off condition.

* * * * *